United States Patent
Hasegawa et al.

(10) Patent No.: US 10,802,724 B2
(45) Date of Patent: Oct. 13, 2020

(54) SELECTING A TAPE DRIVE HAVING A SHORTEST RELATIVE UNMOUNT AND UNLOAD TIME

(71) Applicant: International Business Machines Corporation, Armonk, NY (US)

(72) Inventors: Tohru Hasegawa, Tokyo (JP); Atsushi Abe, Ebina (JP)

(73) Assignee: International Business Machines Corporation, Armonk, NY (US)

( * ) Notice: Subject to any disclaimer, the term of this patent is extended or adjusted under 35 U.S.C. 154(b) by 265 days.

(21) Appl. No.: 15/845,848

(22) Filed: Dec. 18, 2017

(65) Prior Publication Data

US 2019/0187913 A1 Jun. 20, 2019

(51) Int. Cl.
| | |
|---|---|
| G06F 12/00 | (2006.01) |
| G06F 3/06 | (2006.01) |
| G11B 5/008 | (2006.01) |
| G11B 15/68 | (2006.01) |

(52) U.S. Cl.
CPC .......... *G06F 3/0611* (2013.01); *G06F 3/0634* (2013.01); *G06F 3/0653* (2013.01); *G06F 3/0686* (2013.01); *G11B 5/00813* (2013.01); *G11B 15/689* (2013.01); *G11B 15/6835* (2013.01); *G11B 15/6885* (2013.01)

(58) Field of Classification Search
CPC .... G06F 3/0611; G06F 3/0634; G06F 3/0686; G06F 3/0653
See application file for complete search history.

(56) References Cited

U.S. PATENT DOCUMENTS

| | | | |
|---|---|---|---|
| 6,298,439 B1 * | 10/2001 | Beglin | G06F 3/0607 |
| | | | 711/111 |
| 7,886,187 B2 | 2/2011 | Bower et al. | |
| 7,941,621 B1 | 5/2011 | Gipp et al. | |
| 9,483,190 B2 | 11/2016 | Hasegawa et al. | |
| 9,606,736 B2 | 3/2017 | Iliadis et al. | |
| 9,997,193 B1 * | 6/2018 | Hasegawa | G11B 15/1883 |

(Continued)

OTHER PUBLICATIONS

IBM, "Spectrum Archive Library Edition functions," IBM Knowledgecenter, 2017, 3 pages, retrieved from https://www.ibm.com/support/knowledgecenter/en/STZMZN/com.ibm.storage.hollywood.doc/ltfs_new_functionality.html.

(Continued)

*Primary Examiner* — Gurtej Bansal
(74) *Attorney, Agent, or Firm* — Zilka-Kotab, P.C.

(57) ABSTRACT

In one general embodiment, a computer-implemented method includes receiving, by the computer, a request to access a first magnetic recording tape. A determination is made, by the computer, whether the first magnetic recording tape is currently loaded in a tape drive. In response to determining that the first magnetic recording tape is not currently loaded in a tape drive, a determination is made, by the computer, of an amount of time to unmount and unload a magnetic recording tape from each of at least two tape drives each having a magnetic recording tape loaded therein. The tape drive with the shortest amount of time to unmount and unload the magnetic recording tape loaded therein is selected and instructed to unload the magnetic recording tape loaded therein. The first magnetic recording tape is caused to be loaded into the selected tape drive.

20 Claims, 13 Drawing Sheets

(56) References Cited

U.S. PATENT DOCUMENTS

| | | |
|---|---|---|
| 10,296,265 B2 | 5/2019 | Taguchi |
| 2004/0098244 A1* | 5/2004 | Dailey ................. G06F 3/0607 |
| | | 703/24 |
| 2010/0058374 A1* | 3/2010 | Jesionowski ...... G11B 15/6885 |
| | | 720/725 |
| 2015/0286654 A1 | 10/2015 | Kick |
| 2018/0165017 A1 | 6/2018 | Taguchi |

OTHER PUBLICATIONS

IBM, "Unmounting a library," IBM Knowledgecenter, 2017, 3 pages, retrieved from https://www.ibm.com/support/knowledgecenter/en/STZMZN/com.ibm.storage.hollywood.doc/ltfs_unmounting_library.html.
IBM, "IBM System Storage Tape Drive 3592, SCSI Reference," Sixth Edition, Dec. 16, 2014, pp. 1-544.
Taguchi, K., U.S. Appl. No. 15/374,224, filed Dec. 9, 2016.
Hasegawa et al., U.S. Appl. No. 15/469,344, filed Mar. 24, 2017.

* cited by examiner

SELECTING A TAPE DRIVE HAVING A SHORTEST RELATIVE UNMOUNT AND UNLOAD TIME

BACKGROUND

The present invention relates to data storage systems, and more particularly, this invention relates to selection of one of a plurality of tape drives based on a relative time to unmount and unload magnetic recording tapes therein.

Automated data storage libraries are known for providing cost effective storage and retrieval of large quantities of data. The data in automated data storage libraries is typically stored on media of data storage cartridges that are, in turn, stored at storage slots or the like inside the library in a fashion that renders the media, and its resident data, accessible for physical retrieval. Such data storage cartridges are commonly termed "removable media." Data storage cartridge media may comprise any type of media on which data may be stored and which may serve as removable media, including but not limited to magnetic media (such as magnetic recording tape or disks), optical media (such as optical tape or discs), electronic media (such as PROM, EEPROM, flash PROM, CompactFlash™, Smartmedia™, Memory Stick™, etc.), or other suitable media. An example of a data storage cartridge that is widely employed in automated data storage libraries for mass data storage is a magnetic recording tape cartridge.

In addition to data storage media, automated data storage libraries typically comprise data storage drives that store data to, and/or retrieve data from, the data storage cartridge media. Further, automated data storage libraries typically comprise I/O stations at which data storage cartridges are supplied or added to, or removed from, the library. The transport of data storage cartridges between data storage slots, data storage drives, and I/O stations is typically accomplished by one or more accessors. Such accessors have grippers for physically retrieving the selected data storage cartridges from the storage slots within the automated data storage library and transporting such cartridges to the data storage drives by moving, for example, in the horizontal (X) and vertical (Y) directions.

In an effort to increase storage capacity, deep slot technology allows for storage cells that contain more than a single data storage cartridge. Such storage libraries allow for higher density, or more cartridges stored per square foot. In 'deep slot' libraries, two or more cartridges may be stored in a multi-cartridge deep slot cell, arrayed in series, one behind the other, in tiers ranging from a frontmost tier to a rearmost tier.

Data stored in such data storage libraries is often organized and accessed in accordance with a Linear Tape File System (LTFS), which is a software that enables relatively easy access to data stored on magnetic recording tapes in a tape library.

SUMMARY

A computer-implemented method according to one embodiment includes receiving, by the computer, a request to access a first magnetic recording tape. A determination is made, by the computer, whether the first magnetic recording tape is currently loaded in a tape drive. In response to determining that the first magnetic recording tape is not currently loaded in a tape drive, a determination is made, by the computer, of an amount of time to unmount and unload a magnetic recording tape from each of at least two tape drives each having a magnetic recording tape loaded therein. The tape drive with the shortest amount of time to unmount and unload the magnetic recording tape loaded therein is selected and instructed to unload the magnetic recording tape loaded therein. The first magnetic recording tape is caused to be loaded into the selected tape drive.

A computer program product, according to one embodiment, includes a computer readable storage medium having program instructions embodied therewith. The computer readable storage medium is not a transitory signal per se. The program instructions are readable and/or executable by a computer to cause the computer to perform the foregoing method.

A computer-implemented method according to yet another embodiment includes receiving, by the computer, a request to access a first magnetic recording tape. A determination is made as to whether the first magnetic recording tape is currently loaded in a tape drive. In response to determining that the first magnetic recording tape is not currently loaded in a tape drive, a determination is made as to whether one or more tape drives do not have a respective magnetic recording tape loaded therein. In response to determining that each of the one or more tape drives have a respective magnetic recording tape loaded therein, a determination is made as to whether any of the tape drives in which a respective magnetic recording tape is loaded therein have not mounted the respective magnetic recording tape loaded therein. In response to determining that each of the one or more tape drives having a respective magnetic recording tape loaded therein have mounted the respective magnetic recording tapes loaded therein, a determination is made as to whether any of the one or more tape drives have not been accessed for more than a predetermined amount of time. In response to determining that at least two of the tape drives have not been accessed for more than a predetermined amount of time, a determination is made as to whether an amount of time to unmount and unload a magnetic recording tape from each of the at least two tape drives that have not been accessed for more than a predetermined amount of time. The tape drive with the shortest amount of time to unmount and unload the magnetic recording tape loaded therein is selected, and instructed to unload the magnetic recording tape loaded therein. The first magnetic recording tape is caused to be loaded into the selected tape drive. In response to determining that each of the tape drives in which a respective magnetic recording tape is loaded therein have been accessed in less than or equal to the predetermined amount of time, a determination is made as to whether any of the tape drives, in which a respective magnetic recording tape is loaded therein, are not currently performing a requested access. In response to determining that one or more of the tape drives in which a respective magnetic recording tape is loaded therein are not currently performing a requested access, the amount of time since performing a requested access is determined for each of the one or more tape drives that are not currently performing a requested access. The tape drive with the longest amount of time having been elapsed since performing a requested access is selected and instructed to unload the magnetic recording tape loaded therein. The first magnetic recording tape is caused to be loaded into the selected tape drive.

Other aspects and embodiments of the present invention will become apparent from the following detailed description, which, when taken in conjunction with the drawings, illustrate by way of example the principles of the invention.

DETAILED DESCRIPTION

Figure 1:
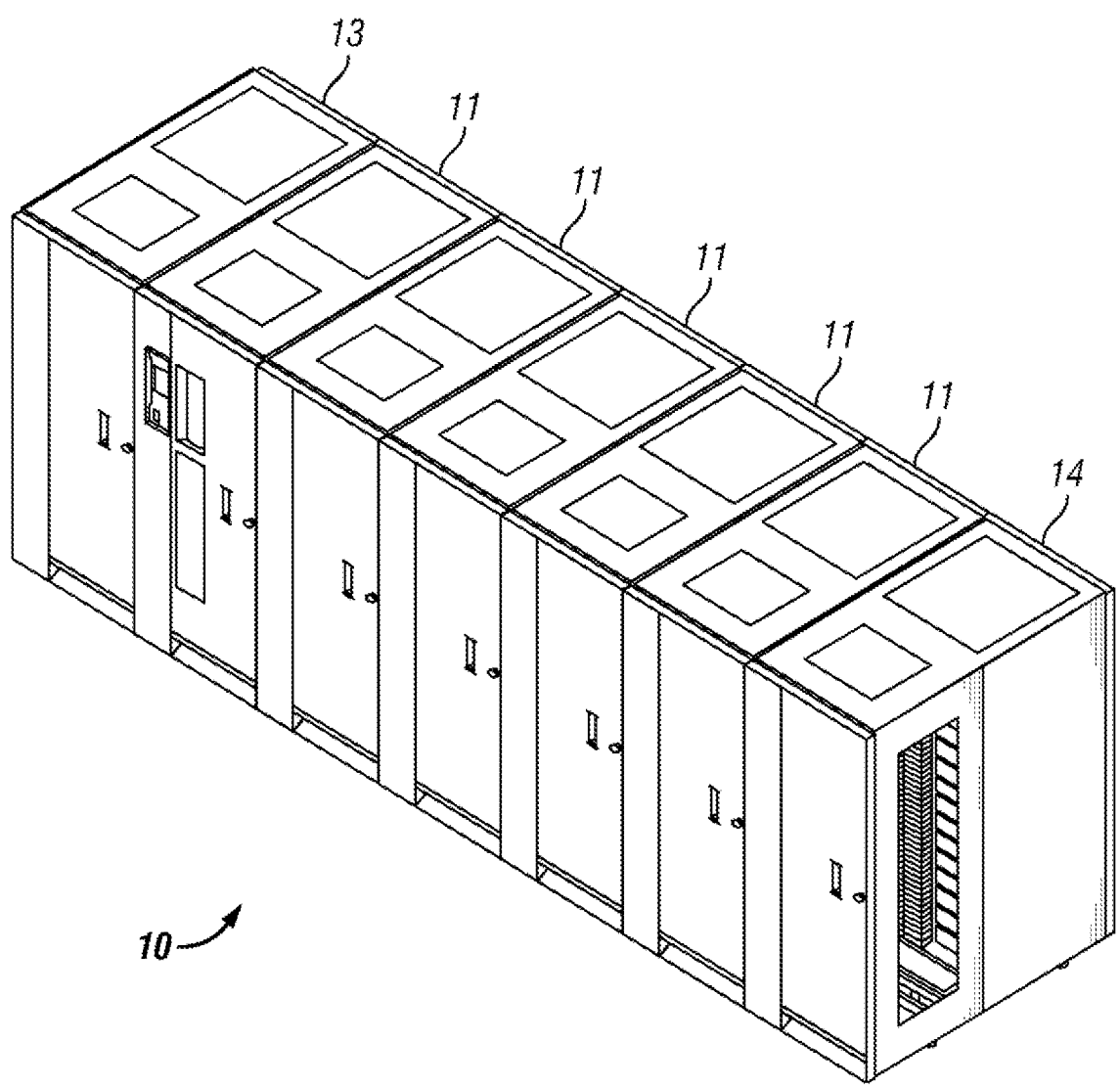
FIG. 1 is a perspective view of an automated data storage library according to one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of magnetic storage systems, as well as operation and/or component parts thereof.

In one general embodiment, a computer-implemented method includes receiving, by the computer, a request to access a first magnetic recording tape. A determination is made, by the computer, whether the first magnetic recording tape is currently loaded in a tape drive. In response to determining that the first magnetic recording tape is not currently loaded in a tape drive, a determination is made, by the computer, of an amount of time to unmount and unload a magnetic recording tape from each of at least two tape drives each having a magnetic recording tape loaded therein. The tape drive with the shortest amount of time to unmount and unload the magnetic recording tape loaded therein is selected and instructed to unload the magnetic recording tape loaded therein. The first magnetic recording tape is caused to be loaded into the selected tape drive.

In another general embodiment, a computer program product includes a computer readable storage medium having program instructions embodied therewith. The computer readable storage medium is not a transitory signal per se. The program instructions are readable and/or executable by a computer to cause the computer to perform the foregoing method.

In another general embodiment, a computer-implemented method includes receiving, by the computer, a request to access a first magnetic recording tape. A determination is made as to whether the first magnetic recording tape is currently loaded in a tape drive. In response to determining that the first magnetic recording tape is not currently loaded in a tape drive, a determination is made as to whether one or more tape drives do not have a respective magnetic recording tape loaded therein. In response to determining that each of the one or more tape drives have a respective magnetic recording tape loaded therein, a determination is made as to whether any of the tape drives in which a respective magnetic recording tape is loaded therein have not mounted the respective magnetic recording tape loaded therein. In response to determining that each of the one or more tape drives having a respective magnetic recording tape loaded therein have mounted the respective magnetic recording tapes loaded therein, a determination is made as to whether any of the one or more tape drives have not been accessed for more than a predetermined amount of time. In response to determining that at least two of the tape drives have not been accessed for more than a predetermined amount of time, a determination is made as to whether an amount of time to unmount and unload a magnetic recording tape from each of the at least two tape drives that have not been accessed for more than a predetermined amount of time. The tape drive with the shortest amount of time to unmount and unload the magnetic recording tape loaded therein is selected, and instructed to unload the magnetic recording tape loaded therein. The first magnetic recording tape is caused to be loaded into the selected tape drive. In response to determining that each of the tape drives in which a respective magnetic recording tape is loaded therein have been accessed in less than or equal to the predetermined amount of time, a determination is made as to whether any of the tape drives, in which a respective magnetic recording tape is loaded therein, are not currently performing a requested access. In response to determining that one or more of the tape drives in which a respective magnetic recording tape is loaded therein are not currently performing a requested access, the amount of time since performing a requested access is determined for each of the one or more tape drives that are not currently performing a requested access. The tape drive with the longest amount of time having been elapsed since performing a requested access is selected and instructed to unload the magnetic recording tape loaded therein. The first magnetic recording tape is caused to be loaded into the selected tape drive.

Figure 2:
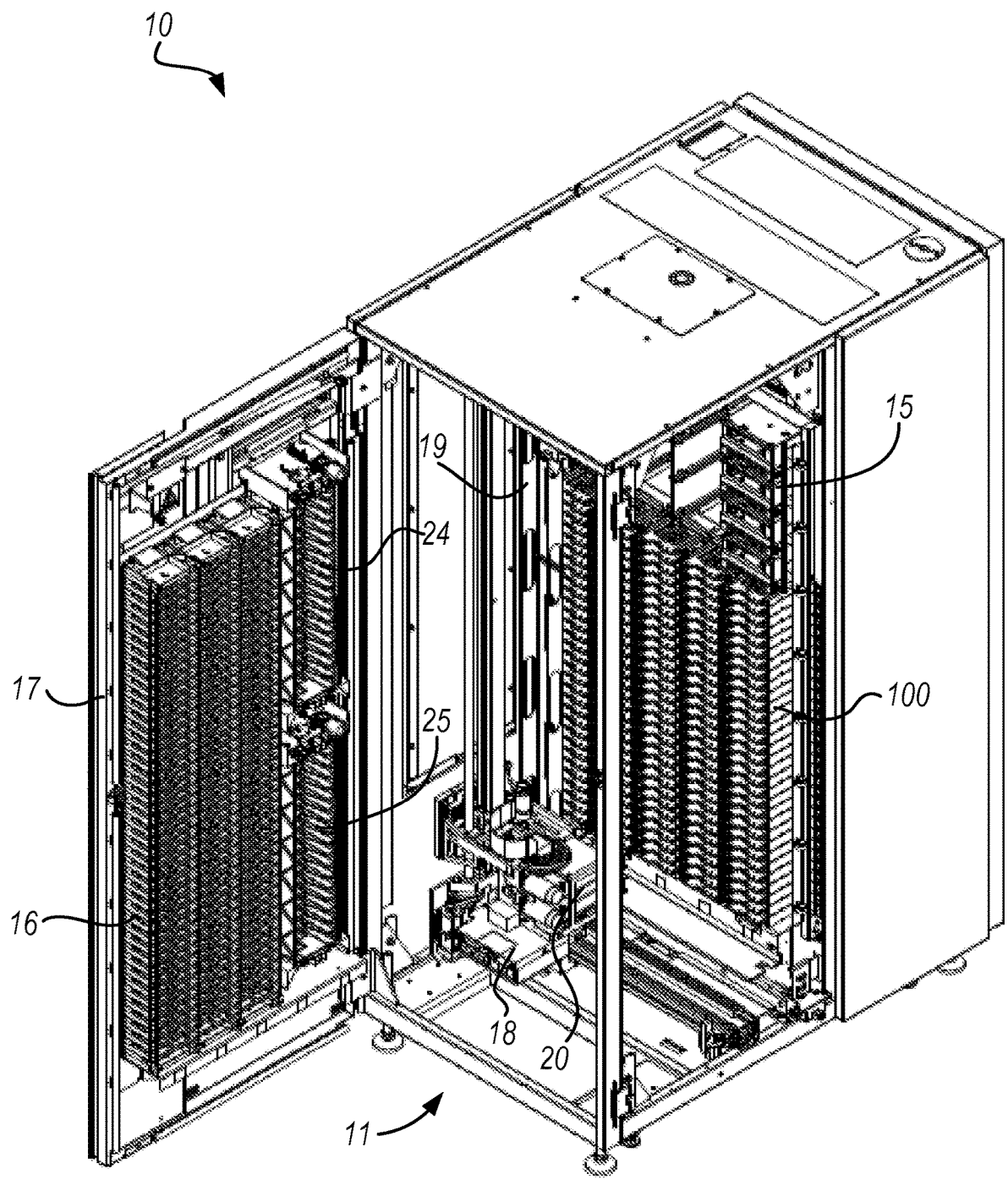
FIG. 2 is a perspective view of a storage frame from the data storage library of FIG. 1.

FIGS. 1-2 illustrate an automated data storage library 10 which stores and retrieves data storage cartridges, containing data storage media (not shown), from multi-cartridge deep slot cells 100 and single cartridge storage slots 16. An example of an automated data storage library which has a similar configuration as that depicted in FIGS. 1-2, and may be implemented with some of the various approaches herein is the IBM 3584 UltraScalable Tape Library. Moreover, it should be noted that references to "data storage media" herein refer to data storage cartridges, and for purposes of the present application, the two terms may be used synonymously.

The library 10 of FIG. 1 comprises a left hand service bay 13, one or more storage frames 11, and right hand service bay 14. As will be discussed in further detail below, a frame may comprise an expansion component of the library. Thus, storage frames may be added or removed to expand or reduce the size and/or functionality of the library. According to different approaches, frames may include additional storage slots, deep slot cells, drives, import/export stations, accessors, operator panels, etc.

FIG. 2 shows an exemplary embodiment of a storage frame 11, which acts as the base frame of the library 10. Moreover, the storage frame 11 illustrated in FIG. 2 is contemplated to be a minimum configuration of the library 10, for which there is only a single accessor 18 (i.e., there are no redundant accessors) and no service bay. However, in other embodiments, a storage frame may include multiple robotic accessors and/or service bays.

Looking to FIG. 2, the library 10 is arranged for accessing data storage media in response to commands from at least one external host system (not shown). The library 10 includes a plurality of storage slots 16 on front wall 17 and a plurality of multi-cartridge deep slot cells 100 on rear wall 19, both of which may be used for storing data storage cartridges that may contain data storage media. According to one approach, the storage slots 16 are configured to store a single data storage cartridge, and the multi-cartridge deep slot cells 100 are configured to store a plurality of data storage cartridges. In a preferred approach, the multi-cartridge deep slot cells may be arranged in sequential order of tiers from front to rear (e.g., see FIG. 7A).

With continued reference to FIG. 2, the storage frame 11 of the library 10 also includes at least one data storage drive 15, e.g., for reading and/or writing data with respect to the data storage media. Additionally, a first accessor 18 may be used to transport data storage media between the plurality of storage slots 16, the multi-cartridge deep slot cells, and/or the data storage drive(s) 15. According to various approaches, the data storage drives 15 may be optical disc drives, magnetic tape drives, solid state drives having non-volatile random access memory (NVRAM) such as Flash memory, or other types of data storage drives as are used to read and/or write data with respect to the data storage media.

As illustrated, the storage frame 11 may optionally include an operator panel or other user interface, such as a web-based interface, which allows a user to interact with the library 10. The storage frame 11 may also optionally comprise an upper I/O station 24 and/or a lower I/O station 25, thereby allowing data storage cartridges to be added (e.g., inserted) to the library inventory and/or removed from the library without disrupting library operation. Furthermore, the library 10 may have one or more storage frames 11, each having storage slots 16, preferably accessible by the first accessor 18.

As described above, the storage frames 11 may be configured with different components depending upon the intended function. One configuration of storage frame 11 may comprise storage slots 16 and/or multi-cartridge deep slot cells 100, data storage drive(s) 15, and other optional components to store and retrieve data from the data storage cartridges. However, in another approach, a storage frame 11 may include storage slots 16 and/or multi-cartridge deep slot cells 100 and no other components. The first accessor 18 may have a gripper assembly 20, e.g., for gripping one or more data storage media, in addition to having a bar code scanner or other reading system, such as a cartridge memory reader or similar system mounted on the gripper assembly 20, to "read" identifying information about the data storage media.

Figure 3:
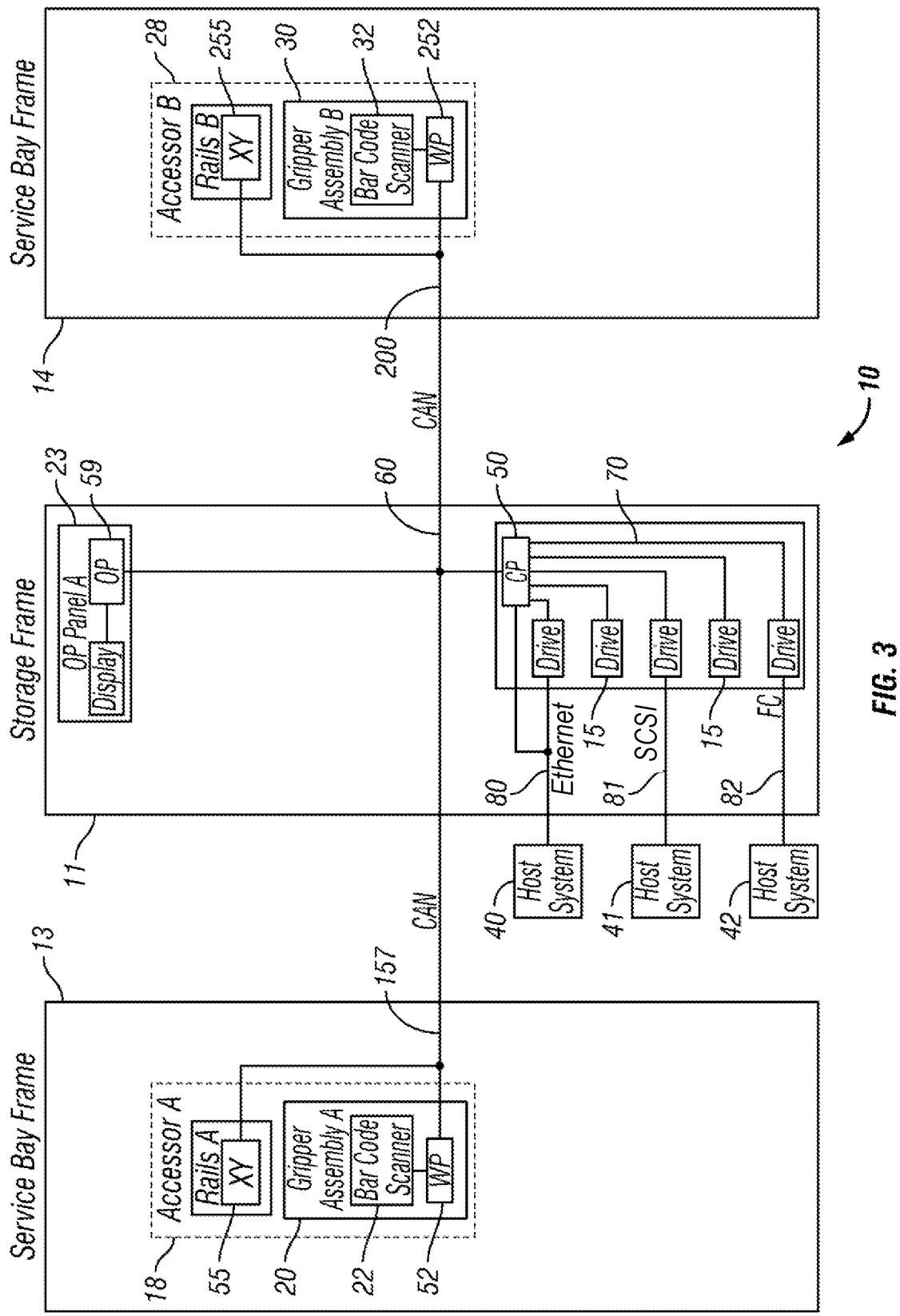
FIG. 3 is a block diagram of an automated data storage library according to one embodiment.

FIG. 3 depicts an automated data storage library 10, in accordance with one embodiment. As an option, the present automated data storage library 10 may be implemented in conjunction with features from any other embodiment listed herein, such as those described with reference to the other FIGS. Of course, however, such automated data storage library 10 and others presented herein may be used in various applications and/or in permutations which may or may not be specifically described in the illustrative embodiments listed herein. Further, the automated data storage library 10 presented herein may be used in any desired environment. Thus FIG. 3 (and the other FIGS.) should be deemed to include any and all possible permutations Referring now to FIG. 3, the automated data storage library 10 as described in reference to FIGS. 1 and 2, is depicted according to one embodiment. According to a preferred approach, the library 10 may employ a controller, e.g., arranged as a distributed system of modules with a plurality of processor nodes.

In one approach, the library is controlled, not by a central controller, but rather, by a distributed control system for receiving logical commands and converting the commands to physical movements of the accessor and gripper, and for operating the drives in accordance with the desired physical movements. The distributed control system may also provide logistical support, such as responding to host requests for element status, inventory, library status, etc. The specific commands, the conversion of those commands to physical movements, and the operation of the drives may be of a type known to those of skill in the art.

While the automated data storage library 10 has been described as employing a distributed control system, various other approaches described and/or suggested herein may be implemented in automated data storage libraries regardless of control configuration, such as, but not limited to, an automated data storage library having one or more library controllers that are not distributed.

Referring still to FIG. 3, the library 10 may have one or more storage frames 11, a left hand service bay 13 and a right hand service bay 14. The left hand service bay 13 is shown with a first accessor 18, where, as discussed above, the first accessor 18 may include a gripper assembly 20 and/or a bar code scanner (e.g., reading system) to "read" identifying information about the data storage media depending on the desired embodiment. Furthermore, the right hand service bay 14 is shown having a second accessor 28, which includes a gripper assembly 30 and may also include a reading system 32 to "read" identifying information about the data storage media.

According to one approach, in the event of a failure or other unavailability of the first accessor 18, or its gripper assembly 20, etc., the second accessor 28 may perform some or all of the functions of the first accessor 18. Thus in different approaches, the two accessors 18, 28 may share one or more mechanical paths, they may have completely independent mechanical paths, or combinations thereof. In one example, the accessors 18, 28 may have a common horizontal rail with independent vertical rails to travel therealong. Moreover, it should be noted that the first and second accessors 18, 28 are described as first and second for descriptive purposes only and this description is not meant to limit either accessor to an association with either the left hand service bay 13, or the right hand service bay 14.

In an exemplary embodiment which is in no way intended to limit the invention, the first and second accessors 18, 28 may preferably move their grippers in at least two directions, called the horizontal "X" direction and vertical "Y" direction, e.g., to retrieve and grip, deliver and release, load and unload, etc. the data storage cartridge at the storage slots 16, multi-cartridge deep slot cells 100, data storage drives 15, etc.

With continued reference to FIG. 3, library 10 receives commands from one or more host systems 40, 41, 42. The host systems 40, 41, 42, such as host servers, communicate with the library directly, e.g., on path 80, through one or more control ports (not shown), or through one or more data storage drives 15 on paths 81, 82. Thus, in different approaches, the host systems 40, 41, 42 may provide commands to access particular data storage cartridges and move the cartridges, for example, between the storage slots 16 and the data storage drives 15. The commands are typically logical commands identifying the cartridges or cartridge media, and/or logical locations for accessing the media. Furthermore, it should be noted that the terms "commands" and "work requests" are used interchangeably herein to refer to such communications from the host system 40, 41, 42 to the library 10 as are intended to result in accessing particular data storage media within the library 10 depending on the desired approach.

According to one embodiment, the library 10 may be controlled by a library controller. Moreover, in various approaches, the library controller may include a distributed control system receiving the logical commands from hosts, determining the required actions, and/or converting the actions to physical movements of the first and/or second accessor 18, 28. In another approach, the distributed control system may have a plurality of processor nodes, each having one or more computer processors. According to one example of a distributed control system, a communication processor node 50 may be located in a storage frame 11. The communication processor node provides a communication link for receiving the host commands, either directly or through the drives 15, via at least one external interface, e.g., coupled to line 80.

Still referring to FIG. 3, the communication processor node 50 may additionally provide a communication link 70 for communicating with the data storage drives 15. As illustrated, the communication processor node 50 may preferably be located in the storage frame 11, e.g., close to the data storage drives 15. Furthermore, one or more additional work processor nodes may be provided to form an exemplary distributed processor system, which may comprise, e.g., a work processor node 52 located at first accessor 18, and that is coupled to the communication processor node 50 via a network 60, 157. According to different approaches, each work processor node may respond to received commands that are broadcast thereto from any communication processor node, and the work processor nodes may also direct the operation of the accessors, e.g., providing move commands. An XY processor node 55 may be provided and may be located at an XY system of first accessor 18. As illustrated, the XY processor node 55 is coupled to the network 60, 157, and is responsive to the move commands, operating the XY system to position the gripper assembly 20.

Also, an operator panel processor node 59 may be provided at the optional operator panel for providing an interface for communicating between the operator panel and the communication processor node 50, the work processor nodes 52, 252, and the XY processor nodes 55, 255.

A network 60, for example comprising a common bus, is provided, coupling the various processor nodes. The network may comprise a robust wiring network, such as the commercially available Controller Area Network (CAN) bus system, which is a multi-drop network, having a standard access protocol and wiring standards, for example, as defined by CiA, the CAN in Automation Association, Am Weich Selgarten 26, D-91058 Erlangen, Germany. Other networks, such as Ethernet, or a wireless network system, such as RF or infrared, may be employed in the library as is known to those of skill in the art. In addition, multiple independent networks may also be used to couple the various processor nodes.

As illustrated in FIG. 3, the communication processor node 50 is coupled to each of the data storage drives 15 of a storage frame 11, via lines 70, and are thereby communicating with the drives 15 and with host systems 40, 41, 42. Alternatively, the host systems 40, 41, 42 may be directly coupled to the communication processor node 50, at input 80 for example, or to control port devices (not shown) which connect the library to the host system(s) with a library interface similar to the drive/library interface. As is known to those of skill in the art, various communication arrangements may be employed for communication with the hosts and with the data storage drives. In the example of FIG. 3, host connections 80 and 81 are intended to be Ethernet and a SCSI bus, respectively, e.g., and may serve as host connections. However, bus 82 comprises an example of a Fibre Channel bus which is a high speed serial data interface, allowing transmission over greater distances than the SCSI bus systems.

According to some approaches, the data storage drives 15 may be in close proximity to the communication processor node 50, and may employ a short distance communication scheme, such as Ethernet, or a serial connection, such as RS-422. Thus, the data storage drives 15 may be individually coupled to the communication processor node 50 by lines 70. Alternatively, the data storage drives 15 may be coupled to the communication processor node 50 through one or more networks.

Furthermore, additional storage frames 11 may be provided, whereby each is preferably coupled to the adjacent storage frame. According to various approaches, any of the additional storage frames 11 may include communication processor nodes 50, storage slots 16, data storage drives 15, networks 60, etc.

Moreover, as described above, the automated data storage library 10 may comprise a plurality of accessors. A second accessor 28, for example, is shown in a right hand service bay 14 of FIG. 3. The second accessor 28 may include a gripper assembly 30 for accessing the data storage media, and an XY system 255 for moving the second accessor 28. The second accessor 28 may run on the same horizontal mechanical path as the first accessor 18, and/or on an adjacent (e.g., separate) path. Moreover, the illustrative control system additionally includes an extension network 200 which forms a network coupled to network 60 of the storage frame(s) 11 and to network 157 of left hand service bay 13.

In FIG. 3 and the accompanying description, the first and second accessors are associated with the left hand service bay 13 and the right hand service bay 14 respectively. However, this is for illustrative purposes and there may not be an actual association. Thus, according to another approach, network 157 may not be associated with the left hand service bay 13 and network 200 may not be associated with the right hand service bay 14. Moreover, depending on the design of the library, it may not be necessary to have a left hand service bay 13 and/or a right hand service bay 14 at all.

An automated data storage library 10 typically comprises one or more controllers to direct the operation of the automated data storage library. Moreover, host computers and data storage drives typically include similar controllers. A library controller may take many different forms and may comprise, for example, but is not limited to, an embedded system, a distributed control system, a personal computer, a workstation, etc. The term "library controller" as used herein is intended in its broadest sense as a device that includes at least one processor, and optionally further circuitry and/or logic, for controlling and/or providing at least some aspects of library operations.

Figure 4:
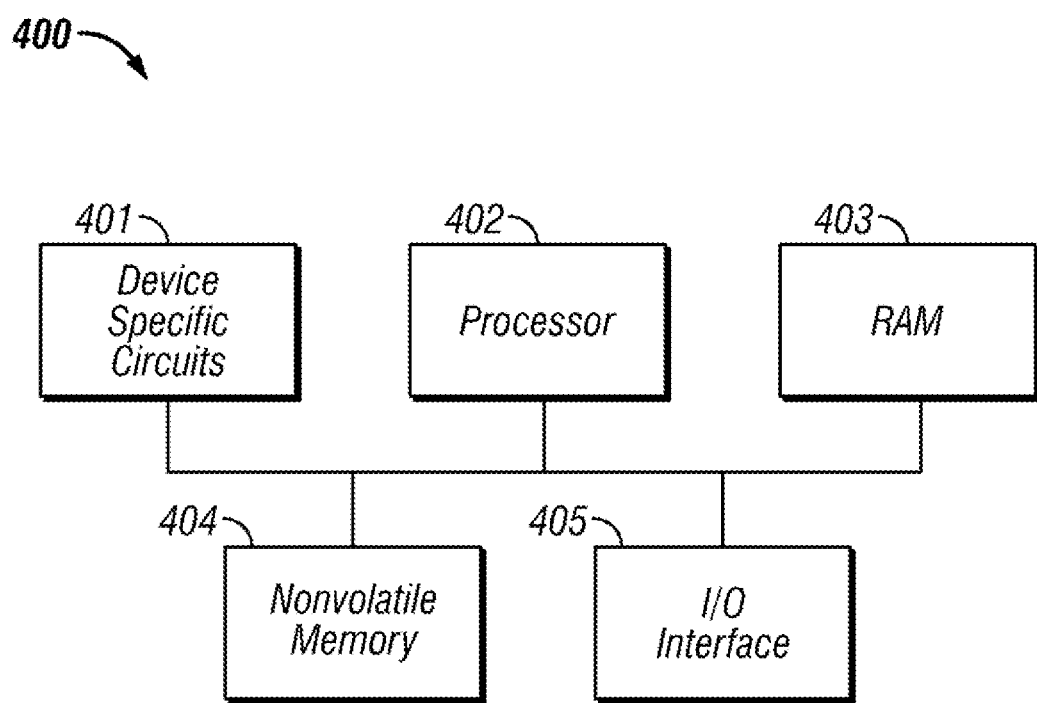
FIG. 4 is a block diagram depicting a controller configuration according to one embodiment.

Referring now to FIG. 4, a typical controller 400 is shown with a processor 402, Random Access Memory (RAM) 403, nonvolatile memory 404, device specific circuits 401, and I/O interface 405. Alternatively, the RAM 403 and/or nonvolatile memory 404 may be contained in the processor 402 as could the device specific circuits 401 and I/O interface 405. The processor 402 may comprise, for example, an off-the-shelf microprocessor, custom processor, Field Programmable Gate Array (FPGA), Application Specific Integrated Circuit (ASIC), discrete logic, etc. The RAM 403 is typically used to hold variable data, stack data, executable instructions, etc.

According to various approaches, the nonvolatile memory 404 may comprise any type of nonvolatile memory such as, but not limited to, Electrically Erasable Programmable Read Only Memory (EEPROM), flash Programmable Read Only Memory (PROM), battery backup RAM, hard disk drives, etc. However, the nonvolatile memory 404 is typically used to hold the executable firmware and any nonvolatile data. Moreover, the I/O interface 405 comprises a communication interface that allows the processor 402 to communicate with devices external to the controller. Examples may comprise, but are not limited to, serial interfaces such as RS-232, USB (Universal Serial Bus) or Small Computer Systems Interface (SCSI). The device specific circuits 401 provide additional hardware to enable the controller 400 to perform unique functions including, but not limited to, motor control of a cartridge gripper. Moreover, the device specific circuits 401 may include electronics that provide, by way of example but not limitation, Pulse Width Modulation (PWM) control, Analog to Digital Conversion (ADC), Digital to Analog Conversion (DAC), etc. In addition, all or part of the device specific circuits 401 may reside outside the controller 400.

While the automated data storage library 10 is described as employing a distributed control system, the various approaches described and/or suggested herein may be implemented in various automated data storage libraries regardless of control configuration, including, but not limited to, an automated data storage library having one or more library controllers that are not distributed. Moreover, a library controller may comprise one or more dedicated controllers of a library, depending on the desired embodiment. For example, there may be a primary controller and a backup controller. In addition, a library controller may comprise one or more processor nodes of a distributed control system. According to one example, communication processor node 50 (e.g., of FIG. 3) may comprise the library controller while the other processor nodes (if present) may assist the library controller and/or may provide backup or redundant functionality. In another example, communication processor node 50 and work processor node 52 may work cooperatively to form the library controller while the other processor nodes (if present) may assist the library controller and/or may provide backup or redundant functionality. Still further, all of the processor nodes may comprise the library controller. According to various approaches described and/or suggested herein, a library controller may have a single processor or controller, or it may include multiple processors or controllers.

Figure 5A:
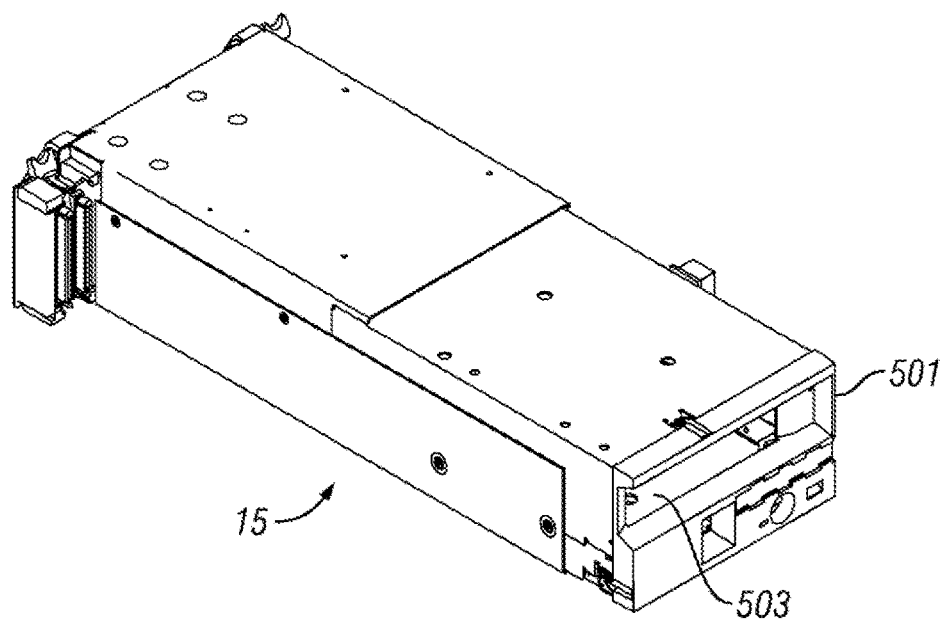
FIG. 5A is a front perspective view of a data storage drive according to one embodiment.
Figure 5B:
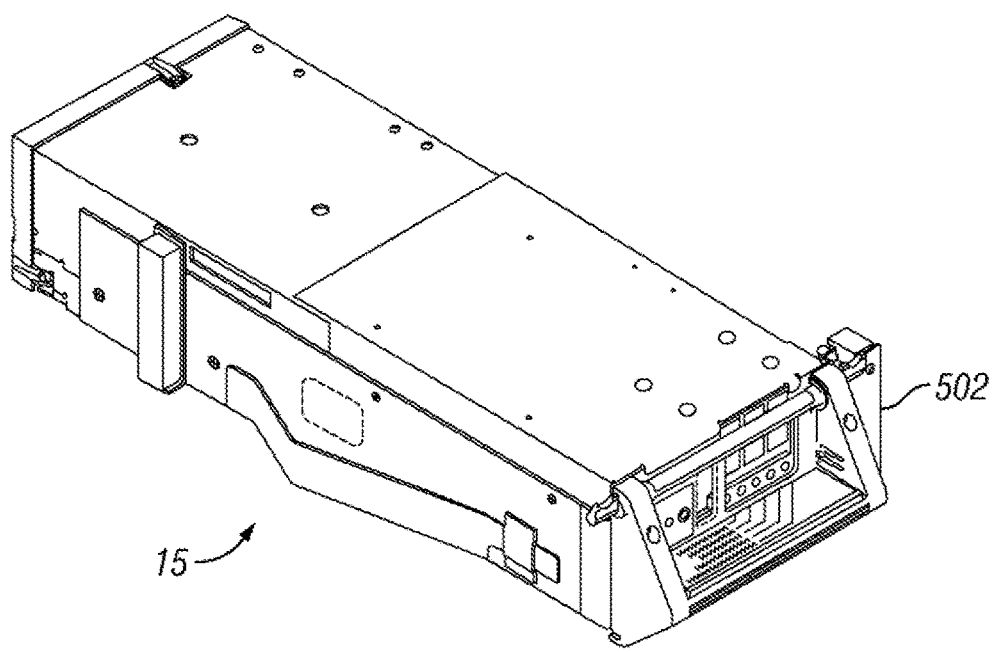
FIG. 5B is a rear perspective view of the data storage drive of FIG. 5A.

FIGS. 5A-5B illustrate the front 501 and rear 502 views of a data storage drive 15, according to one embodiment. In the example depicted in FIGS. 5A-5B, the data storage drive 15 comprises a hot-swap drive canister, which is in no way intended to limit the invention. In fact, any configuration of data storage drive may be used whether or not it includes a hot-swap canister. As discussed above, a data storage drive 15 is used to read and/or write data with respect to the data storage media, and may additionally communicate with a memory which is separate from the media, and is located within the cartridge. Thus, according to one approach, a data storage cartridge may be placed into the data storage drive 15 at opening 503.

Figure 6:
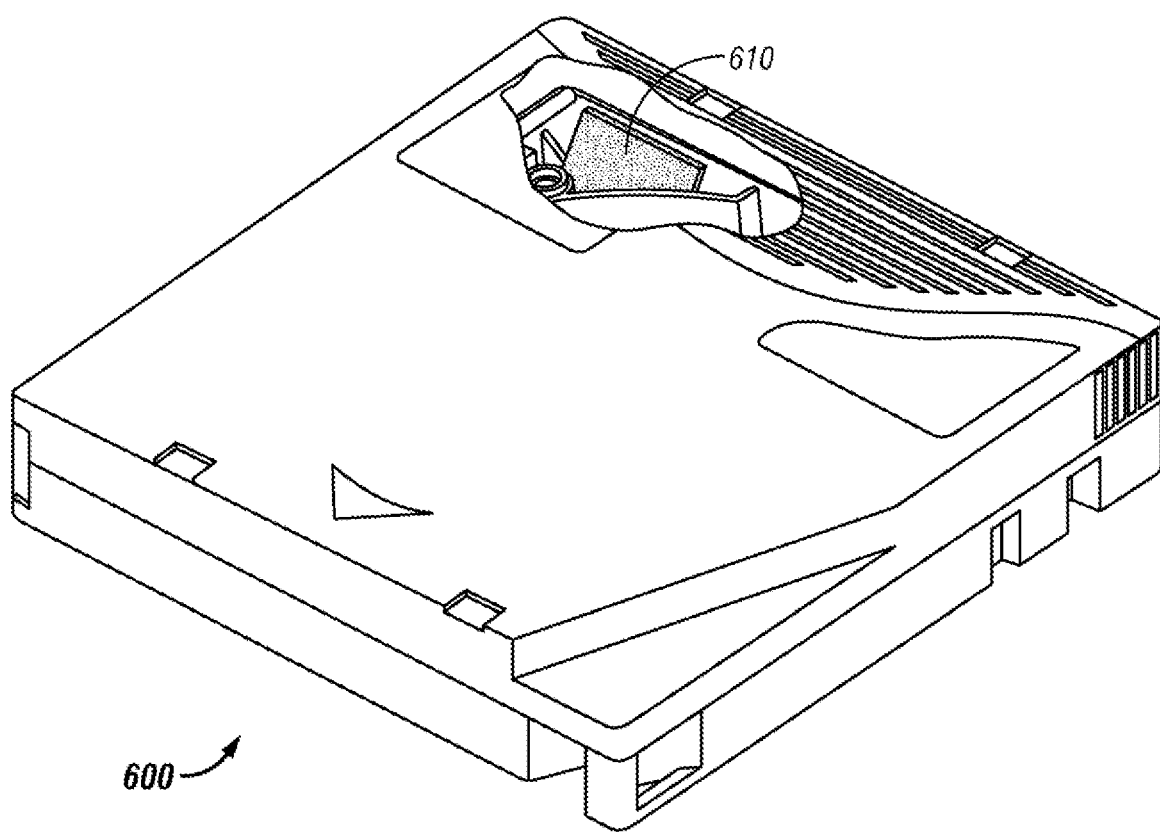
FIG. 6 is perspective view of a data storage cartridge having a cutaway portion, according to one embodiment.

Furthermore, FIG. 6 illustrates an embodiment of a data storage cartridge 600 with a cartridge memory 610 shown in a cutaway portion of the Figure, which is in no way intended to limit the invention. In fact, any configuration of data storage cartridge may be used whether or not it comprises a cartridge memory. According to various approaches, media of the data storage cartridge media may include any type of media on which data may be stored, including but not limited to magnetic media, e.g., magnetic recording tape, disks, etc.; optical media, e.g., optical tape, discs, etc.; electronic media, e.g., PROM, EEPROM, flash PROM, CompactFlash™, Smartmedia™, Memory Stick™, etc.; etc., or other suitable media. Moreover, an example of a data storage cartridge that is widely employed in automated data storage libraries for mass data storage is a magnetic tape cartridge in which the media is magnetic recording tape.

Figure 7A:
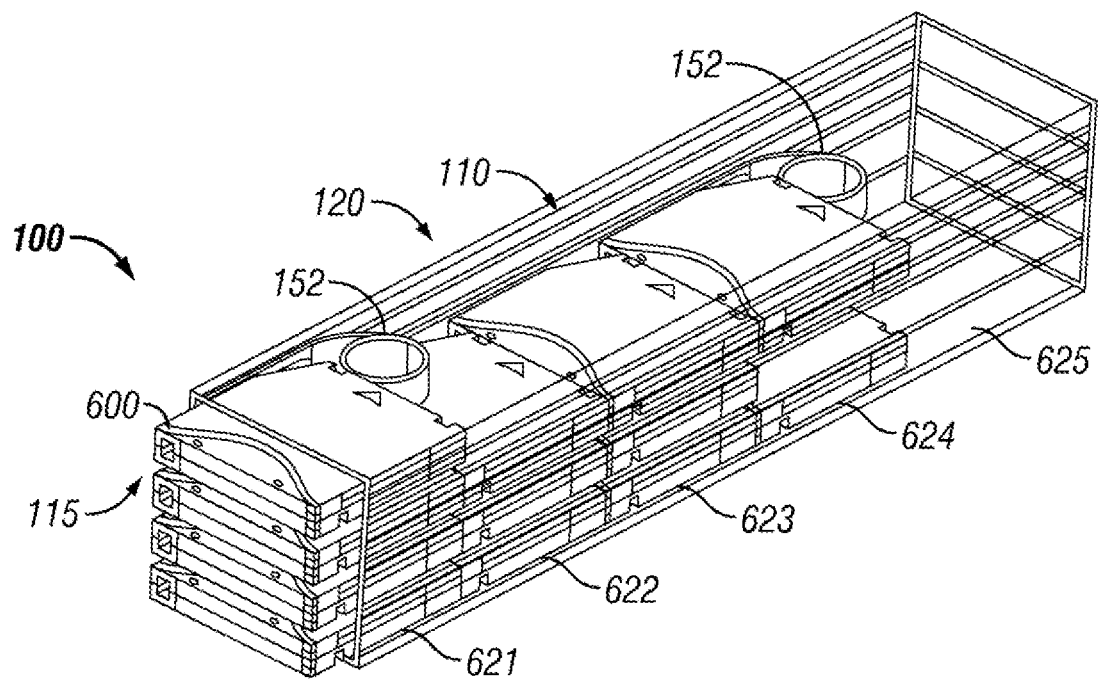
FIGS. 7A-7B are perspective views of a multi-cartridge deep slot cell according to one embodiment.
Figure 7B:
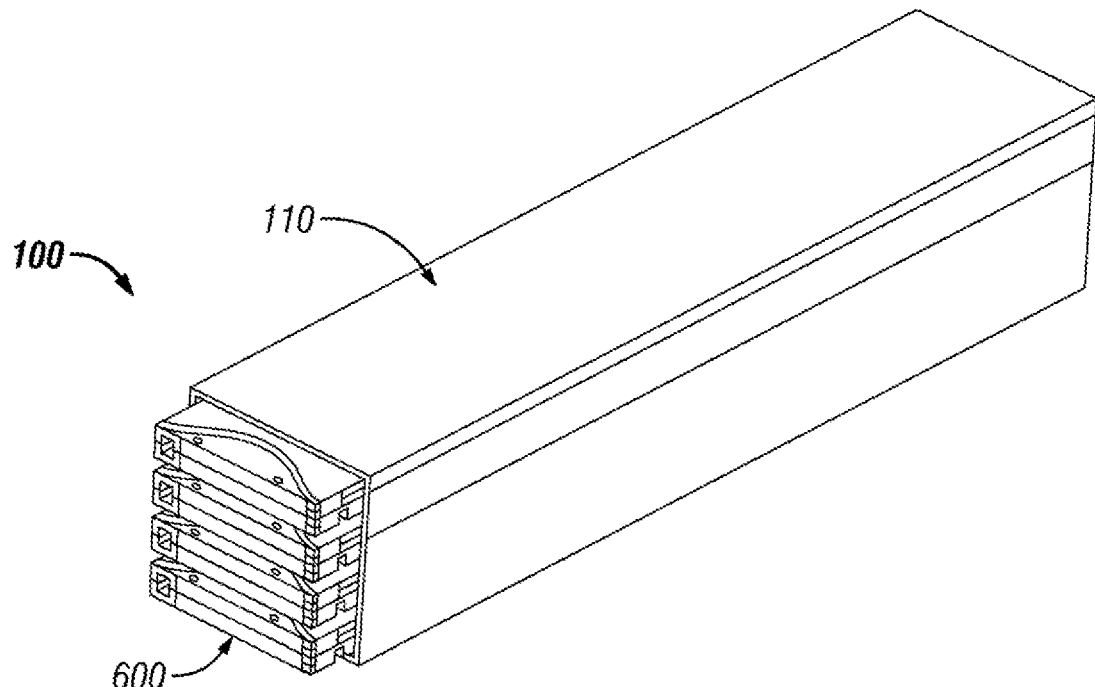

Looking now to FIGS. 7A-7B, a multi-cartridge deep slot cell 100 having biasing springs 152 is depicted according to one embodiment. As shown in the illustrative embodiment, the multi-cartridge deep slot cell 100 comprises a housing 110 defining an interior space 115. Furthermore, a plurality of storage slots 120 is disposed within the housing, and may be configured for storing up to a plurality of data storage cartridges 600, depending on the desired approach. Alternatively, the multi-cartridge deep slot cell 100 may be built into the frame of the automated data storage library according to one approach.

In accordance with one embodiment, storage slots 120 are depicted as being configured for storing up to a plurality of data storage cartridges 600, and arranged in sequential order of tiers 621, 622, 623, 624, 625 from front to rear. It should be noted that the frontmost tier 621 is also called "tier 1", while the next tier 622 is called "tier 2", etc., and the last tier 625 is also called the "rearmost" tier. However, referring to FIG. 2, in one embodiment, the single cartridge storage slots 16 are also termed "tier 0".

Referring again to FIGS. 1-3, according to one embodiment, the controller of automated data storage library 10 may operate the accessor(s) 18, 28 to selectively extract, place and/or transport data storage cartridges with respect to the multi-cartridge deep slot cells 100 and/or other elements of the automated data storage library 10. For example, the controller may facilitate extracting a cartridge from a multi-cartridge deep slot cell 100, transporting the cartridge to a data storage drive 15 and placing the cartridge in the drive 15. The controller may then extract the cartridge from the data storage drive 15, while directing the accessor to transport the cartridge to a specific multi-cartridge deep slot cell 100, and place the cartridge therein.

In one embodiment, one or more data storage cartridges may be added into the library, e.g., at an I/O station 24, 25, whereby the controller of the automated data storage library 10 may then operate the accessor(s) 18, 28 to transport the cartridge(s) to specific multi-cartridge deep slot cell(s) 100, and place the cartridge(s) therein. Similarly, the controller may operate the accessor(s) to selectively extract, place and transport data storage cartridges with respect to the single cartridge storage slots 16, and/or transport inserted or added cartridge(s) to specific single cartridge storage slots 16.

Figure 8:
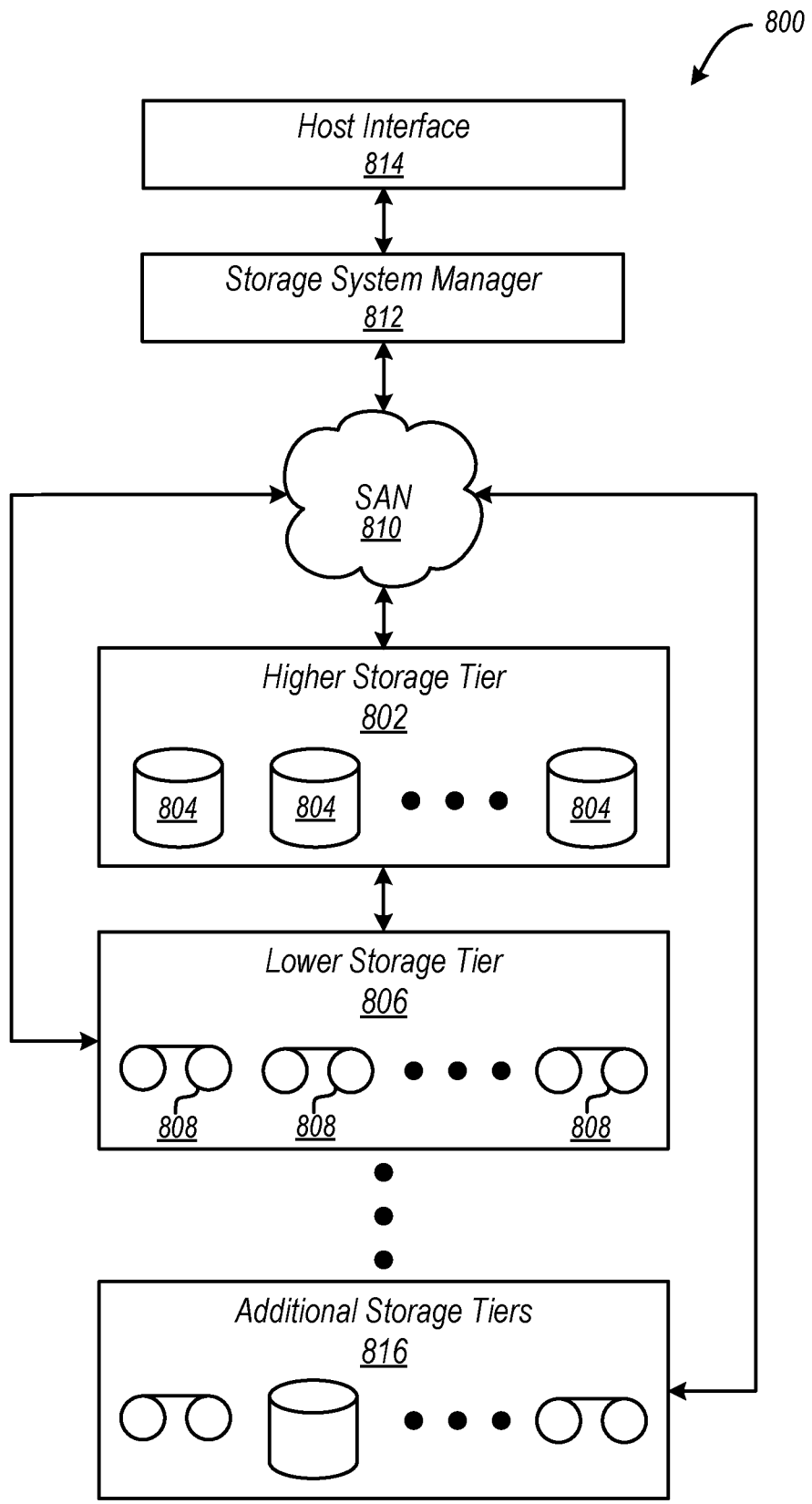
FIG. 8 is a system diagram of a tiered data storage system in accordance with one embodiment.

Now referring to FIG. 8, a storage system 800 is shown according to one embodiment. Note that some of the elements shown in FIG. 8 may be implemented as hardware and/or software, according to various embodiments. In some approaches, the storage system 800 may be implemented in an automated data storage library such as that shown in FIGS. 1-2. In other approaches, an automated data storage library such as that shown in FIGS. 1-2 may be a tier of the storage system 800.

The storage system 800 may include a storage system manager 812 for communicating with a plurality of media on at least one higher storage tier 802 and at least one lower storage tier 806. The higher storage tier(s) 802 preferably may include one or more random access and/or direct access media 804, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 806 may preferably include one or more lower performing storage media 808, including sequential access media such as magnetic recording tape in tape drives and/or optical media, slower accessing HDDs, slower accessing SSDs, etc., and/or others noted herein or known in the art. One or more additional storage tiers 816 may include any combination of storage memory media as desired by a designer of the system 800. Also, any of the higher storage tiers 802 and/or the lower storage tiers 806 may include some combination of storage devices and/or storage media.

The storage system manager 812 may communicate with the storage media 804, 808 on the higher storage tier(s) 802 and lower storage tier(s) 806 through a network 810, such as a storage area network (SAN), as shown in FIG. 8, or some other suitable network type. The storage system manager 812 may also communicate with one or more host systems (not shown) through a host interface 814, which may or may not be a part of the storage system manager 812. The storage system manager 812 and/or any other component of the storage system 800 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 800 may include any number of data storage tiers, and may include the same or different storage memory media within each storage tier. For example, each data storage tier may include the same type of storage memory media, such as HDDs, SSDs, sequential access media (tape in tape drives, optical disc in optical disc drives, etc.), direct access media (CD-ROM, DVD-ROM, etc.), or any combination of media storage types. In one such configuration, a higher storage tier 802, may include a majority of SSD storage media for storing data in a higher performing storage environment, and remaining storage tiers, including lower storage tier 806 and additional storage tiers 816 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 802, while data not having one of these attributes may be stored to the additional storage tiers 816, including lower storage tier 806. Of course, one of skill in the art, upon reading the present descriptions, may devise many other combinations of storage media types to implement into different storage schemes, according to the embodiments presented herein.

According to some embodiments, the storage system (such as 800) may include logic configured to receive a request to open a data set, logic configured to determine if the requested data set is stored to a lower storage tier 806 of a tiered data storage system 800 in multiple associated portions, logic configured to move each associated portion of the requested data set to a higher storage tier 802 of the tiered data storage system 800, and logic configured to assemble the requested data set on the higher storage tier 802 of the tiered data storage system 800 from the associated portions. Of course, this logic may be implemented as a method on any device and/or system or as a computer program product, according to various embodiments.

File systems may be used to control how data is stored in, and retrieved from, memory. Thus, a file system may include the processes and data structures that an operating system uses to keep track of files in memory, e.g., the way the files are organized in memory. Linear Tape File System (LTFS) is an exemplary format of a file system that may be implemented in a given library in order to enables access to compliant tapes. It should be appreciated that various embodiments herein can be implemented with a wide range of file system formats, including for example IBM Spectrum Archive Library Edition (LTFS LE). However, to provide a context, and solely to assist the reader, some of the embodiments below may be described with reference to LTFS which is a type of file system format. This has been done by way of example only, and should not be deemed limiting on the invention defined in the claims.

A tape cartridge may be "loaded" by inserting the cartridge into the tape drive, and the tape cartridge may be "unloaded" by removing the tape cartridge from the tape drive. Once loaded in a tape drive, the tape in the cartridge may be "threaded" through the drive by physically pulling the tape (the magnetic recording portion) from the tape cartridge, and passing it above a magnetic head of a tape drive. Furthermore, the tape may be attached on a take-up reel to move the tape over the magnetic head.

Once threaded in the tape drive, the tape in the cartridge may be "mounted" by reading metadata on a tape and bringing the tape into a state where the LTFS is able to use the tape as a constituent component of a file system. Moreover, in order to "unmount" a tape, metadata is preferably first written on the tape (e.g., as an index), after which the tape may be removed from the state where the LTFS is allowed to use the tape as a constituent component of a file system. Finally, to "unthread" the tape, the tape is unattached from the take-up reel and is physically placed back into the inside of a tape cartridge again. The cartridge may remain loaded in the tape drive even after the tape has been unthreaded, e.g., waiting for another read and/or write request. However, in other instances, the tape cartridge may be unloaded from the tape drive upon the tape being unthreaded, e.g., as described above.

Magnetic recording tape is a sequential access medium. Thus, new data is written to the tape by appending the data at the end of previously written data. It follows that when data is recorded in a tape having only one partition, metadata (e.g., allocation information) is continuously appended to an end of the previously written data as it frequently updates and is accordingly rewritten to tape. As a result, the rearmost information is read when a tape is first mounted in order to access the most recent copy of the metadata corresponding to the tape. However, this introduces a considerable amount of delay in the process of mounting a given tape.

To overcome this delay caused by single partition tape mediums, the LTFS format includes a tape that is divided into two partitions, which include an index partition and a data partition. The index partition may be configured to record metadata (meta information), e.g., such as file allocation information (Index), while the data partition may be configured to record the body of the data, e.g., the data itself.

Figure 9:
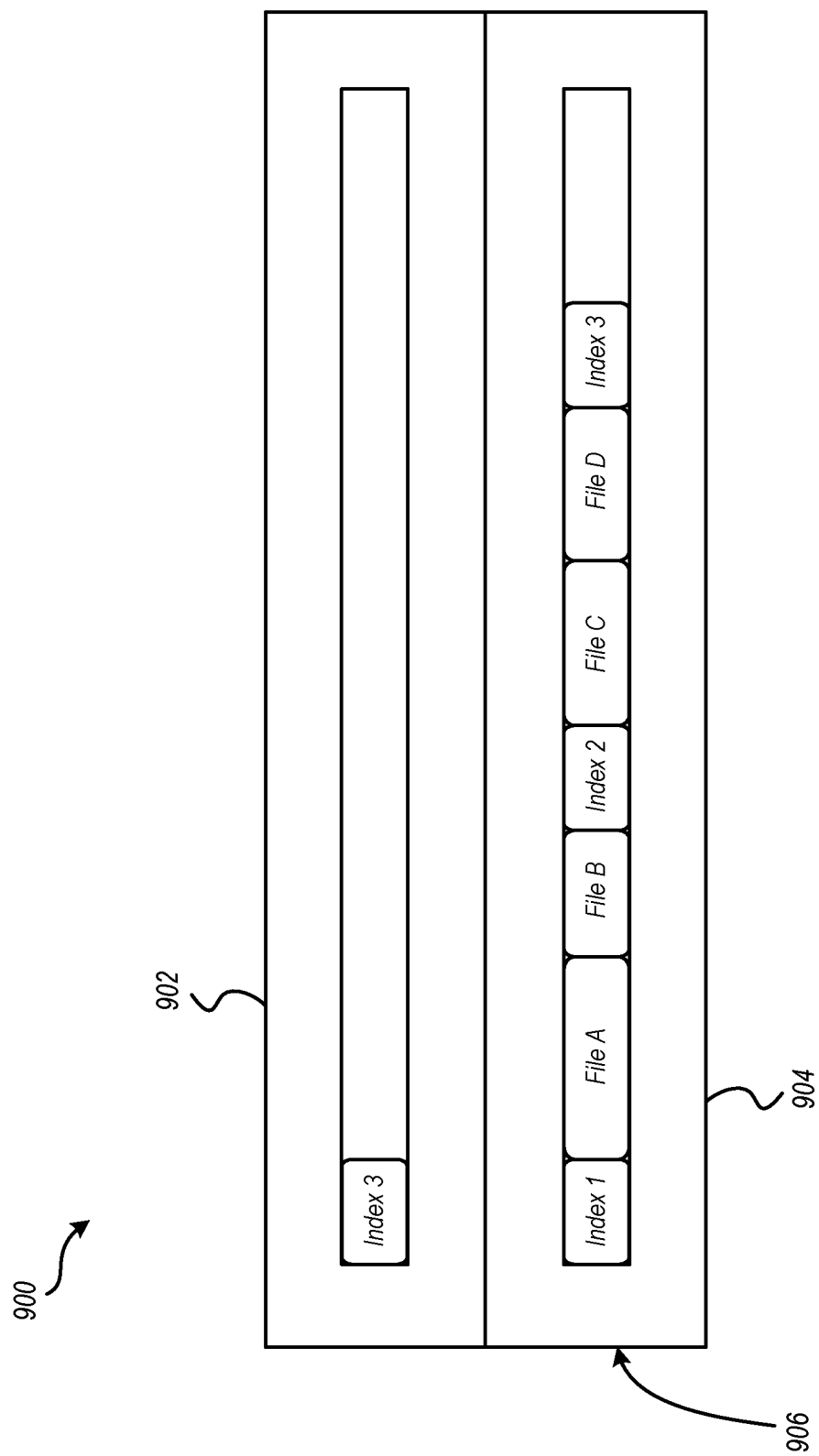
FIG. 9 is a representational diagram of files and indexes stored on a magnetic recording tape according to one embodiment.

Looking to FIG. 9, a magnetic recording tape 900 having an index partition 902 and a data partition 904 is illustrated according to one embodiment. As shown, data files and indexes are stored on the tape. The LTFS format allows for index information to be recorded in the index partition 902 at the beginning of tape 906, as would be appreciated by one skilled in the art upon reading the present description.

As index information is updated, it preferably overwrites the previous version of the index information, thereby allowing the currently updated index information to be accessible at the beginning of tape in the index partition. According to the specific example illustrated in FIG. 9, a most recent version of metadata Index 3 is recorded in the index partition 902 at the beginning of the tape 906. Conversely, all three version of metadata Index 1, Index 2, Index 3 as well as data File A, File B, File C, File D are recorded in the data partition 904 of the tape. Although Index 1 and Index 2 are old (e.g., outdated) indexes, because information is written to tape by appending it to the end of the previously written data as described above, these old indexes Index 1, Index 2 remain stored on the tape 900 in the data partition 904 without being overwritten.

The metadata may be updated in the index partition 902 and/or the data partition 904 the same or differently depending on the desired embodiment. According to some embodiments, the metadata of the index and/or data partitions 902, 904 may be updated in response to the tape being unmounted, e.g., such that the index may be read quickly from the index partition when that tape is mounted again. The metadata is preferably also written in the data partition 904 so the tape may be mounted using the metadata recorded in the data partition 904, e.g., as a backup option.

Data that is stored in data storage systems, e.g., such as data storage libraries that include one or more magnetic recording tapes and one or more tape drives, is often organized and accessed in accordance with LTFS. For example, such data may be written as "files" in a format compliant with the LTFS version being used. Some versions of LTFS provide a file system allowing access to data in a data storage library such as a tape library system. For example, a library-enabled version of LTFS may allow a user to access a tape by accessing a file or directory in a file system without specifying where the tape is located in the tape library nor which tape drive is used to mount the tape. In some embodiments, IBM Spectrum Archive Library Edition may be installed on a computer coupled to the tape library as the library-enabled version of LTFS. For example, LTFS may be installed in a computer system running Windows and/or Linux. Typically, LTFS is installed into the Linux on the computer. Then, the computer communicates with the tape library via a SAN, such as SAN 810 of FIG. 8. Hereafter, "library-enabled version of LTFS" will be used interchangeably with "LTFS."

A host or server may access file data on tape using the LTFS. According to an exemplary approach, which is in no way intended to limit the invention, an LTFS Index may be read from a magnetic recording tape into a storage device (e.g., such as memory or a disk of the library). According to various embodiments, an index of information on a magnetic recording tape may include data that is obtained in the process of converting meta-information about files and directories expanded in memory by LTFS into an Extensible Markup Language (XML) format conforming to LTFS. For example, the information stored in the LTFS Index may correspond to files on the magnetic recording tape, and may include the name, size, number of blocks, offset, etc., of each of the files. The LTFS Index may also store the wrap and linear position (LPOS) information of each of the files (specific data), and therefore positional information of the various files on the tape may be gleaned from the LTFS Index and used accordingly.

A library-enabled version of LTFS used in some embodiments may eliminate unnecessary manual processes, e.g., such as moving a magnetic recording tape in the tape library, mounting and unmounting a magnetic recording tape, etc. by only loading and mounting a tape in response to receiving a request to access a file that is stored on that particular magnetic recording tape. Specifically, a library-enabled version of LTFS may access meta-information, e.g., file names, time stamps, etc., of all the data that has been mounted in the tape library, caching this meta-information in memory. Thereafter, only when the data itself is actually needed to be accessed such as for creating, updating, or reading a file, is the tape loaded and mounted.

The library-enabled version of LTFS preferably does not unmount a magnetic recording tape immediately after accessing data written on the magnetic recording tape. Rather the magnetic recording tape remains mounted in a tape drive, as there may be a presumed likelihood that the just accessed magnetic recording tape will be accessed again soon thereafter. Accordingly, in response to receiving a request to access data that is stored on a different magnetic recording tape that is not at that time loaded in a tape drive, the LTFS may instruct a different tape drive to load and mount the magnetic recording tape corresponding to the requested access. An empty tape drive is selected if one is available. However, when each of the tape drives of the tape drive library are already in use, e.g., currently have a magnetic recording tape loaded therein, are currently loading a magnetic recording tape, are currently mounting a magnetic recording tape mounted therein, are currently spooling a magnetic recording tape that is loaded therein, etc., LTFS may select a tape drive to unload.

A least recently used (LRU) algorithm may be implemented for selection of a drive to unload. In one approach, a tape drive that has least recently experienced a requested access is selected for unloading. In response to such a selection being made, the magnetic recording tape that is loaded in the LRU tape drive may be unmounted (if mounted) and unloaded, and the magnetic recording tape corresponding to the requested access may be loaded and mounted in the tape drive to perform the requested access.

A drawback of this LRU approach is that it often results in the selection of a tape drive that is more time consuming to unmount and unload than another drive would be. This is due in part to factors such as the differing amounts of data, number of files, etc. on the different magnetic recording tapes loaded in associated tape drives; how much of each tape has been unspooled from the cartridge and the consequential rewind time; and how long it takes to write indexes to each of the various magnetic recording tapes. For example, assume that the data of a first magnetic recording tape has been updated but not yet indexed, while the data of a second magnetic recording tape has not been updated after a most recent index was written. More time may be required to unmount and unload the first magnetic recording tape than the second magnetic recording tape, due to the need to write the index to the first magnetic recording tape prior to unmounting and unloading.

Moreover, because the writing time of an index tends to increase with the number of files and directories stored on the particular magnetic recording tape, a magnetic recording tape having a greater number of files and directories may correspond to a relatively longer index writing time than a magnetic recording tape having a lesser number of files and directories stored thereon. For example, as the number of files stored on a magnetic recording tape increases by 100,000, the index associated with the files may increase by approximately 120 megabytes (megabytes hereafter "MB"), give or take a few MB when considering one or more additional variables, such as the length of each file name, the size of an extended attribute attached to each file, etc. When compressed, the index size is typically about 48 MB for 100,000 files. Assuming that the rate of writing to tape is 140 MB/second, it will take about 0.3 seconds for the 48 MB compressed index to be written to the magnetic recording tape (hereafter "magnetic recording tape A" in the present example), e.g., 48 MB/(140 MB/second)=0.3 seconds. Note that this example assumes that the index and/or data is written to the magnetic recording tape A while the associated write head of the magnetic recording tape drive is reciprocated in the longitudinal direction.

In continuance of the present example, assume that it takes ninety seconds to spool magnetic recording tape A (relative to the position of the write head) from the end of a data partition to a location on magnetic recording tape A where the index is to be written. Accordingly, the time to unmount and unload magnetic recording tape A will be at least 90.3 seconds.

Now assume that a second magnetic recording tape, "magnetic recording tape B", has an unmount and unload time of 5 seconds from a drive that magnetic recording tape B is loaded in. Also assume that a tape library includes three magnetic recording tapes (A, B, C) and two tape drives (D, E), that magnetic recording tape A and magnetic recording tape B are mounted and loaded in tape drives D, E (respectively), and a requested access for data stored on magnetic recording tape C has been received. Because magnetic recording tape C is not currently loaded in a tape drive, either magnetic recording tape A or magnetic recording tape B will be unmounted and unloaded from the respective tape drive in order to perform the requested access. If magnetic recording tape A is selected by a LRU based algorithm for unmounting and unloading from tape drive D, it may take a longer time than was otherwise necessary to fulfill the requested access of magnetic recording tape C. For example, a selection of magnetic recording tape B for unloading from tape drive E would have otherwise provided a tape drive (tape drive E) for magnetic recording tape C to be loaded in, in 85.3 seconds less time than unmounting and unloading magnetic recording tape A from tape drive D would take.

Embodiments described herein provide relatively faster fulfillment of access requests in a tape library, by loading an unloaded magnetic recording tape corresponding to a requested access in a tape drive having a shortest relative unmount and unload time, provided that the tape library does not currently have an available tape drive upon receiving the requested access.

Figure 10:
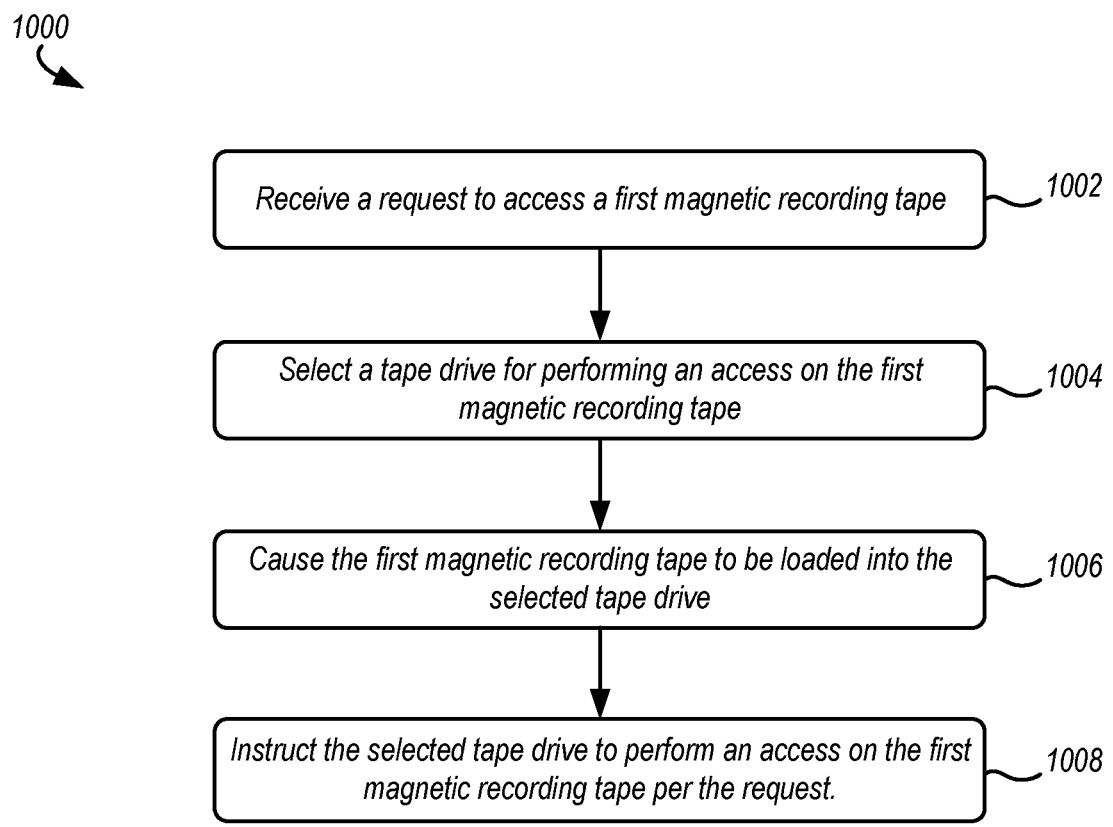
FIG. 10 is a flowchart of a method, in accordance with one embodiment.

Now referring to FIG. 10, a flowchart of a method 1000 for selecting a tape drive for performing a requested access is shown according to one embodiment. The method 1000 may be performed in accordance with the present invention in any of the environments depicted in FIGS. 1-9, among others, in various embodiments. Of course, more or less operations than those specifically described in FIG. 10 may be included in method 1000, as would be understood by one of skill in the art upon reading the present descriptions.

Each of the steps of the method 1000 may be performed by any suitable component of the operating environment. For example, in various embodiments, the method 1000 may be partially or entirely performed by a computer such as: a computer in communication with a tape library, a controller such as a library controller, or equivalently, some other device having one or more processors therein, such as a storage system manager, a remote host, etc. The processor, e.g., processing circuit(s), chip(s), and/or module(s) implemented in hardware and/or software, and preferably having at least one hardware component may be utilized in any device to perform one or more steps of the method 1000. Illustrative processors include, but are not limited to, a central processing unit (CPU), an application specific integrated circuit (ASIC), a field programmable gate array (FPGA), etc., combinations thereof, or any other suitable computing device known in the art.

It should be noted that any operations, decisions, sub-operations, and/or sub-decisions of method 1000 may be performed and/or determined in direct response and/or in indirect response to any action, e.g., operation, decisions, sub-operation, sub-decision, etc., being performed and/or determined. For example, according to one approach, a reference of "in response to" herein may refer to a direct response, e.g., depend on the most previous operations and/or decision being performed and/or determined. According to another approach, a reference of "in response to" herein may refer to an indirect response, where the indirect response may occur for any reason and/or in response to any intervening operations and/or decisions being performed and/or determined.

Operation 1002 of method 1000 includes receiving a request to access a first magnetic recording tape. According to various embodiments, the received request may correspond to any type of requested access of the first magnetic recording tape. According to one approach, the received request may correspond to an accessing of the first magnetic recording tape for reading data that is stored on the first magnetic recording tape. According to another approach, the received request may correspond to an accessing of the first magnetic recording tape for writing data to the first magnetic recording tape.

Operation 1004 of method 1000 includes selecting a tape drive for the first magnetic recording tape. A tape drive may be selected for the first magnetic recording tape, so that an action, e.g., writing, reading, spooling, etc., associated with the request to access a first magnetic recording tape may be performed. Various embodiments and approaches for selecting a tape drive for the first magnetic recording tape will now be described in the flowchart of FIG. 11, depicting an exemplary process performed by operation 1004.

Figure 11:
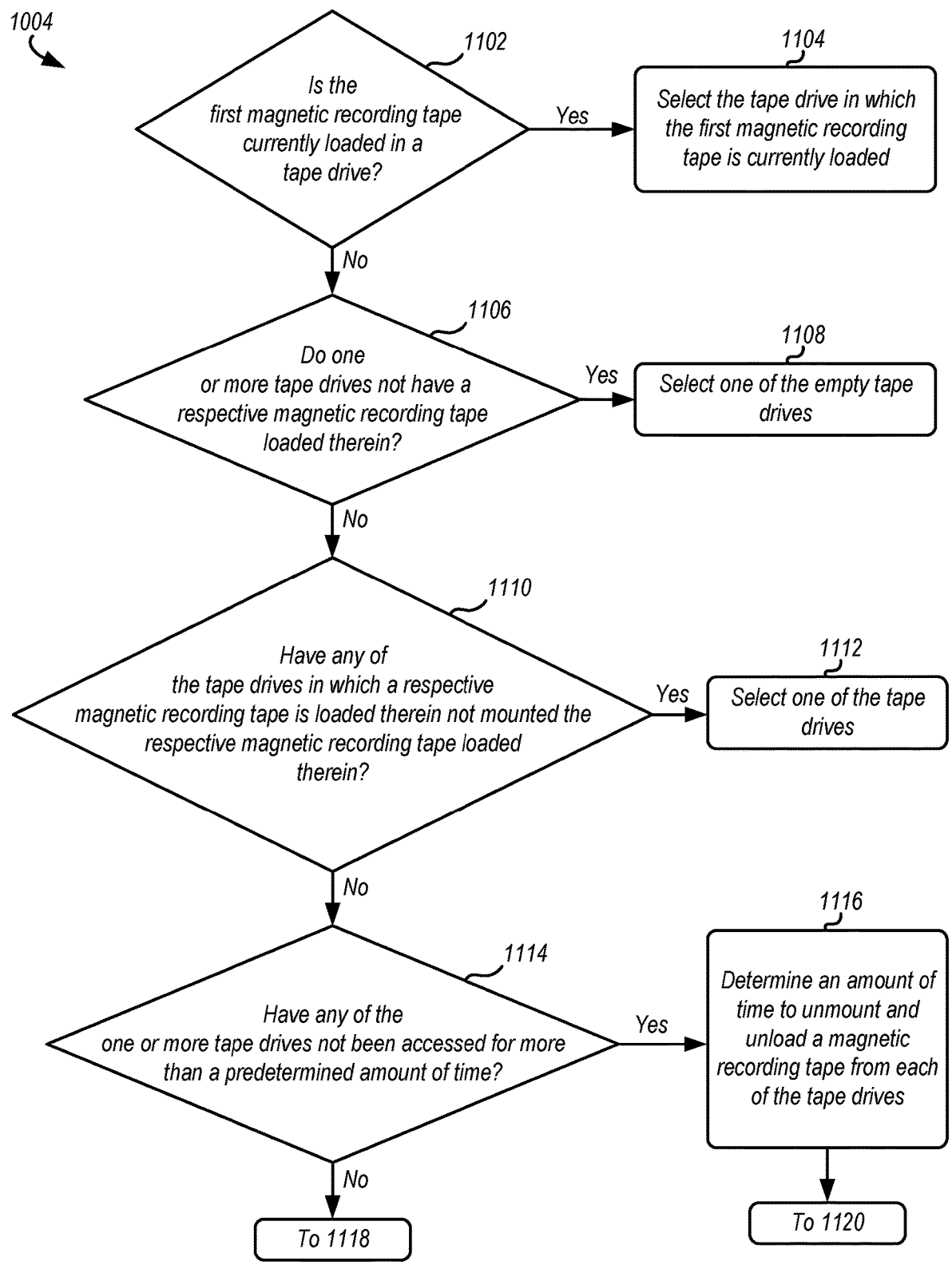
FIG. 11 is a flowchart of a method which corresponds to an operation of the method of FIG. 10, in accordance with one embodiment.
Figure 11:
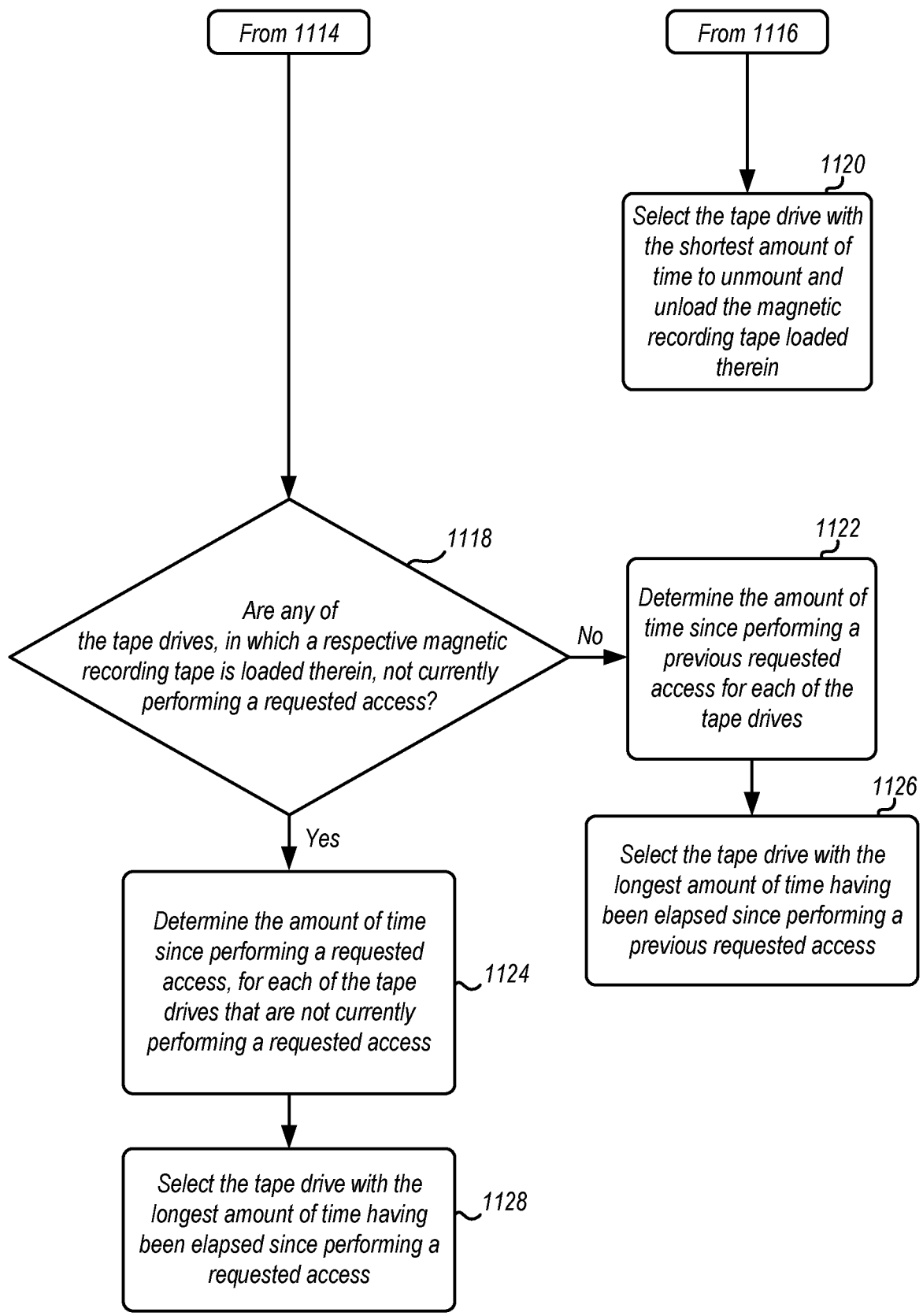

Looking to FIG. 11, exemplary sub-operations and sub-decisions for selecting a tape drive for the magnetic recording tape of method 1000 are illustrated in accordance with one embodiment, which is in no way intended to limit the invention. One or more of such sub-operations and/or sub-decisions may be used to perform operation 1004 of FIG. 10, and/or in conjunction with any other operations described elsewhere herein.

Sub-decision 1102 of operation 1004 includes determining whether the first magnetic recording tape is currently loaded in a tape drive. In response to determining that the first magnetic recording tape is currently loaded in a tape drive (as illustrated by the "Yes" logical path from sub-decision 1102), the tape drive in which the first magnetic recording tape is currently loaded may be selected, e.g., see sub-operation 1104.

Finding a tape drive having the first magnetic recording tape currently loaded therein may be the fastest option for performing the requested access, as no magnetic recording tape loading and/or unloading would occur to perform the requested access. Thereafter, the first magnetic recording tape may be mounted (if not already mounted) and spooled in accordance with the requested access, e.g., so that a read and/or write operation may be performed on the first magnetic recording tape at such a location.

According to one embodiment, in response to determining that the first magnetic recording tape is not currently loaded in a tape drive (as illustrated by the "No" logical path from sub-decision 1102), it may be determined whether one or more tape drives do not have a respective magnetic recording tape loaded therein, e.g., empty tape drives. See sub-decision 1106.

According to various approaches, it may be desirable to select an empty tape drive (when available) for loading the first magnetic recording tape, because the empty tape drive may be immediately available, and selection thereof avoids the time required to unload an active tape drive.

In response to determining that one or more tape drives do not have a respective magnetic recording tape loaded therein (as illustrated by the "Yes" logical path from sub-decision 1106), one of the one or more tape drives that does not have a respective magnetic recording tape loaded therein may be selected, e.g., see sub-operation 1108.

In response to determining that none of the tape drives are empty (as illustrated by the "No" logical path from sub-decision 1106), a determination may be made whether any of the tape drives in which a respective magnetic recording tape is loaded therein have not mounted the respective magnetic recording tape loaded therein, e.g., see sub-decision 1110.

According to various embodiments, a tape drive in which a respective magnetic recording tape is loaded therein but has not mounted the magnetic recording tape may have a shorter unload time than a tape drive in which a respective magnetic recording tape is loaded therein and has mounted the magnetic recording tape. This is because the tape drive having the respective magnetic recording tape loaded and mounted therein may have to unmount the magnetic recording tape prior to unloading the magnetic recording tape, e.g., in order to index data updates that have occurred on the magnetic recording tape. For example, according to one approach an unmounting of a loaded magnetic recording tape may include updating the data partition index and/or updating the index partition index, prior to unmounting and unloading the magnetic recording tape from the tape drive.

In response to determining that one or more tape drives in which a respective magnetic recording medium is loaded therein have not mounted the respective magnetic recording tape loaded therein (as illustrated by the "Yes" logical path from sub-decision 1110), one of the tape drives in which a respective magnetic recording medium loaded therein has not been mounted may be selected, e.g., see sub-operation 1112.

In response to determining that each of the tape drives having a respective magnetic recording tape loaded therein have mounted the respective magnetic recording tapes loaded therein (as illustrated by the "No" logical path from sub-decision 1110), it may be determined whether any of the one or more tape drives have not been accessed for more than a predetermined amount of time, e.g., see sub-decision 1114. The predetermined amount of time may be derived from any source, such a database, designation by a user, etc. According to various approaches, the predetermined amount of time may include, e.g., seconds, minutes, hours, etc.

Where a single tape drive has not been accessed for more than the predetermined amount of time, that drive may be selected. Where multiple tape drives have not been accessed for more than a predetermined amount of time (as illustrated by the "Yes" logical path from sub-decision 1114), an amount of time to unmount and unload a magnetic recording tape from each of those tape drives may be determined, e.g., see sub-operation 1116 so that the tape drive with the shortest amount of time to unmount and unload the magnetic recording tape is selected to serve the requested access in sub-operation 1120.

With continued reference to sub-operation 1116, a determination of the amount of time to unmount and unload a magnetic recording tape may use any one or more time variables that correspond to operations associated with unmounting and unloading the magnetic recording tape from the respective the tape drive.

Figure 12:
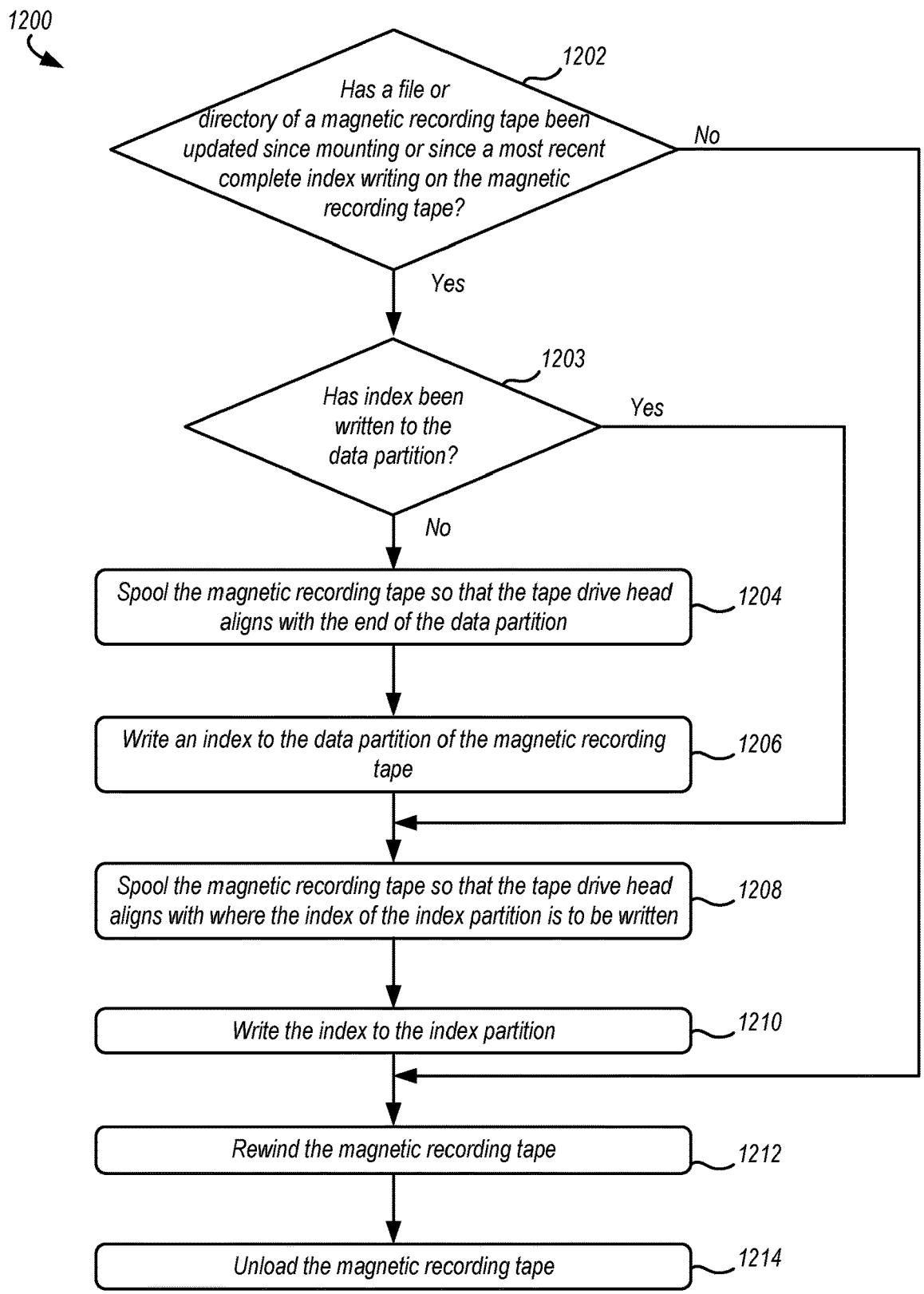
FIG. 12 is a flowchart of a method for unmounting and unloading a magnetic recording tape, in accordance with one embodiment

To place the present description in a context, reference is made to FIG. 12, which illustrates a method 1200 for unmounting and unloading a magnetic recording tape from a tape drive is shown according to one embodiment. The method 1200 may be performed in accordance with the present invention in any of the environments depicted in FIGS. 1-11, among others, in various embodiments. Of course, more or less operations than those specifically described in FIG. 12 may be included in method 1200, as would be understood by one of skill in the art upon reading the present descriptions.

Each of the steps of the method 1200 may be performed by any suitable component of the operating environment. For example, in various embodiments, the method 1200 may be partially or entirely performed by or under direction of a computer, or some other device having one or more processors therein. The processor, e.g., processing circuit(s), chip(s), and/or module(s) implemented in hardware and/or software, and preferably having at least one hardware component may be utilized in any device to perform one or more steps of the method 1200. Illustrative processors include, but are not limited to, a central processing unit (CPU), an application specific integrated circuit (ASIC), a field programmable gate array (FPGA), etc., combinations thereof, or any other suitable computing device known in the art.

Prior to unloading a magnetic recording tape from a tape drive, consideration should be given as to whether there have been any updates performed on the magnetic recording tape that have not yet been indexed. Accordingly, referring to FIG. 12, decision 1202 includes determining whether a file and/or directory of a magnetic recording tape has been updated since the magnetic recording tape was mounted or since a most recent complete index writing has been performed on the magnetic recording tape. A complete index writing has occurred when the tape may be unmounted and unloaded without writing further index information to the magnetic recording tape. In a preferred approach, a complete index writing includes writing an index to both the data partition and the index partition.

In response to determining that a file or directory of a magnetic recording tape has not been updated since mounting or since a most recent index writing on the magnetic recording tape (as illustrated by the "No" logical path from decision 1202), the magnetic recording tape may be rewound (if necessary) and unloaded, e.g., see operations 1212, 1214, discussed below.

If a file and/or directory of a magnetic recording tape has been updated since the magnetic recording tape was mounted or since a most recent complete index writing has been performed on the magnetic recording tape, an unmounting procedure is performed to ensure that the updates to the file and/or directory are reflected in an index that is written on the magnetic recording tape.

For example, with momentarily reference back to FIG. 9, assume for purposes of an example that File C and File D have just been written to the magnetic recording tape 900, and a request to unload the magnetic recording tape 900 from the tape drive in which it is loaded and mounted is received. Prior to performing an unloading, the magnetic recording tape 900 is preferably unmounted according to operations 1204-1210 of FIG. 12, to ensure that metadata of the added File C and File D is properly recorded in the indexes of the data partition 904 and the index partition 902 of the magnetic recording tape 900.

Accordingly, referring again to FIG. 12, in response to determining that a file and/or directory of a magnetic recording tape has been updated since mounting or since a most recent complete index writing has been performed on the magnetic recording tape (as illustrated by the "Yes" logical path from decision 1202), method 1200 may include performing one or more operations for recording such updates, e.g., see operations 1203-1210.

In some embodiments, during normal usage, an index may be written in the data partition periodically to avoid the data loss due to an event such as a sudden power loss. However, the index may only be written in the data partition. This may be convenient, as the tape may be spooled to about the position of where the last write operation terminated. Operation 1203 determines whether such an index has been written to the data partition. If so, because the index has not been written to the index partition, the process proceeds to operation 1208. If an index has not already been written to the data partition since the last write operation, the process continues to operation 1204.

Operation 1204 of method 1200 includes spooling the magnetic recording tape so that the tape drive head is aligned with the end of data in the data partition. With continued reference to the above example, referring again to FIG. 9, the spooling of operation 1204 of method 1200 may include spooling the magnetic recording tape 900 so that a tape drive head aligns with an end of File D, which was the last data written. The end of File D may also correspond to the location where Index 3 will be written in the data partition 904.

Accordingly, referring again to FIG. 12, operation 1206 of method 1200 includes writing an index (e.g., Index 3 of FIG. 9) to the data partition of the magnetic recording tape.

Operation 1208 of method 1200 includes spooling the magnetic recording tape so that the tape drive head is aligned with the position where the index of the index partition is to be written. Referring again to FIG. 9, the spooling of operation 1208 of method 1200 may include spooling the magnetic recording tape 900 so that the tape drive head is aligned with the location of where Index 3 will be written in the index partition 902.

Accordingly, referring again to FIG. 12, operation 1210 of method 1200 includes writing an index (e.g., Index 3 of FIG. 9) to the index partition of the magnetic recording tape.

Each of the operations 1204-1214 of the process of FIG. 12 takes a certain amount of time, the summation of which correlates to the amount of time to unmount (if necessary) and unload a magnetic recording tape from a tape drive. Moreover, the amount of time for each operation is dependent upon a variety of factors particular to the current state of the magnetic recording tape and drive, such as where items such as the end of data and index partition on the magnetic recording tape are currently positioned relative to the head, the size of the index, how much of the tape is unspooled from the cartridge, etc. Accordingly, each operation 1204-1214 may provide a time variable, such as a time to rewind the magnetic recording tape, e.g., as in operation 1212 and a time to unload the respective magnetic recording tape from the associated tape drive upon being rewound, e.g., as in operation 1214, that may be used to determine the amount of time to unmount and unload the magnetic recording tape.

Referring again to sub-operation 1116 of FIG. 11, the amount of time to unmount and unload a magnetic recording tape from each drive is determined so that the tape drive with the shortest amount of time to unmount and unload the magnetic recording tape is selected to serve the requested access in sub-operation 1120. Which time variables to use in calculating the amount of time to unmount and unload a magnetic recording tape may depend on the current state of the magnetic recording tape and drive, such as whether data on the magnetic recording tape has been updated but not yet indexed. Accordingly, the determination of the amount of time to unmount and unload each respective magnetic recording tape from the associated tape drive may include determining whether data on the magnetic recording tape has been updated but not yet indexed. In response to determining that data on a particular magnetic recording tape has been updated but not yet indexed, time variables corresponding to the various operations during unmounting and unloading may be estimated for use in determining the amount of time to unmount and unload the magnetic recording tape from the associated tape drive.

According to various approaches, an estimated time for unmounting and unloading a magnetic recording tape loaded in each tape drive may include any one or more of, and preferably each of: a time to move to an end of a data partition of the magnetic recording tape, a time to write an index to the data partition of the magnetic recording tape, e.g., based on a size of the index; a time to move to a position where an index of an index partition is to be written; a time to write the index of the data partition to the index partition of the magnetic recording tape; a time to rewind the magnetic recording tape; and a time to unload the magnetic recording tape.

According to one illustrative embodiment, in response to determining that data on the magnetic recording tape has been updated but not yet indexed, the estimated time for unmounting and unloading the magnetic recording tape may be estimated and used in the following equation, i.e., see Equation (1).

$$M(A)=T_d+T_{xd}+T_i+T_{xi}+T_r+T_u \qquad \text{Equation (1)}$$

In Equation (1), the variable M(A) represents the amount of time to unmount and unload a magnetic recording tape 'A' from a tape drive having the magnetic recording tape A loaded therein, the variable $T_d$ represents a time to spool to an end of a data partition of the magnetic recording tape A, the variable $T_{xd}$ represents a time to write an index to the data partition of the magnetic recording tape A, the variable $T_i$ represents a time to spool to a position on the magnetic recording tape A where the index of the index partition is to be written, the variable $T_{xi}$ represents a time to write the index to the index partition of the magnetic recording tape A, the variable $T_r$ represents a time to rewind the magnetic recording tape A, and the variable $T_u$ represents a time to unload the magnetic recording tape A. Again, note that one or more of the variables of Equation (1) may represent estimated values and/or known values depending on the embodiment. The variables may be estimated using known techniques, such as by referencing: a table correlating index size to approximate writing times, a table correlating LPOS information to approximate spooling times at normal spooling speeds, drive specifications listing an approximate unloading time, etc. Moreover, calculations using known algorithms may be performed to estimate some or all of the times.

According to one embodiment, the estimated values of the index writing time, e.g., variables $T_{xd}$ and/or $T_{xi}$, may vary depending on the index size of a particular magnetic recording tape. According to one approach, the library-enabled version of LTFS includes software for estimating the index size of a particular magnetic recording tape. Moreover, the index writing times, e.g., variables $T_{xd}$ and/or $T_{xi}$, may be estimated from the estimated index size, and in consideration of reduction in data size due to compression and the writing speed of the tape drive.

According to various embodiments, the estimated values of the time to move to the end of the data partition of the magnetic recording tape and/or the time to move to the position on the magnetic recording tape where the index of the index partition is to be written and/or the time to rewind the magnetic recording tape, e.g., variables $T_d$, $T_i$, and $T_r$ (respectively), may be estimated based on the LPOS position of the magnetic tape relative to the magnetic head in the tape drive, which corresponds to the amount of tape unspooled from the supply reel.

According to one embodiment, the values of one or more variables of Equation (1) may be estimated by the tape drive in which the associated magnetic recording tape is loaded. According to one approach, one or more of the variables $T_d$, $T_i$, and/or $T_r$ may be estimated using a Recommended Access Order (RAO) function. For example, a Small Computer System Interface (SCSI) command may be used to the tape drive to instruct the tape drive to estimate the values of one or more of the variables $T_d$, $T_i$, and/or $T_r$ based on the state of the magnetic recording tape, e.g., its current LPOS position. The drive may then return the requested information to the requesting device, e.g., the device issuing the SCSI command.

According to one embodiment, a value for the variable $T_u$ may be statically determined by considering the type of tape drive that the magnetic recording tape is loaded in, e.g., from drive specifications.

In a preferred embodiment, the amount of time to unmount and unload a magnetic recording tape from a tape drive having the magnetic recording tape loaded therein may be estimated by calculating the size of an index of the magnetic recording tape, and issuing a command, e.g., such as the SCSI command described above and/or a command that includes instructions to perform any of the various estimation operations described herein, to the tape drive in which the magnetic recording tape is loaded.

In another embodiment, information usable to estimate one or more of the time variables may be passed from the tape drive to a remote processor, such as a library controller, a host, etc., for calculation of some or all of the time variables. The tape drive may also pass some estimated time variables to the remote processor.

Equation (1) and/or any of the estimation techniques described herein may be used to determine which tape drive has the shortest amount of time to unmount and unload the magnetic recording tape loaded therein. Such a determination may enable the requested access to be performed in a shorter amount of time, e.g., see sub-operation 1120.

Referring again to operation 1202 of FIG. 12, when data on the magnetic recording tape has not been updated since a most recent index writing or mounting, e.g., the index on the magnetic recording tape reflects the current state of the tape and therefore does not need to be rewritten prior to unloading the magnetic recording tape, time variables associated with unmounting the magnetic recording tape may be omitted or deemed to have a value of zero. Accordingly, estimated times for rewinding and unloading the magnetic recording tape may be the only time variables considered in sub-operation 1116 of FIG. 11 for such a magnetic recording tape and drive.

Accordingly, Equation (1), above, may simplified to Equation (2), below, where $T_r$ represents a time to rewind the magnetic recording tape A, and $T_u$ represents a time to unload the magnetic recording tape A.

$$M(A)=T_r+T_u \qquad \text{Equation (2)}$$

Similarly, where operation 1203 determines that an index has been written to the data partition (but not the index partition), Equation (1), above, may simplified to Equation (3), below, where $T_i$ represents the time to spool to a position on the magnetic recording tape A where the index of the index partition is to be written, $T_{xi}$ represents a time to write the index to the index partition of the magnetic recording tape A, $T_r$ represents a time to rewind the magnetic recording tape A, and $T_u$ represents a time to unload the magnetic recording tape A.

$$M(A)=T_i+T_{xi}+T_r+T_u \qquad \text{Equation (3)}$$

Referring again to FIG. 11, once the relative amounts of time to unmount (if needed) and unload each magnetic recording tape from the associated tape drive, the tape drive with the shortest amount of time to unmount (if needed) and unload the magnetic recording tape loaded therein is selected in sub-operation 1120.

In response to a tape drive being selected for the first magnetic recording tape, the selected tape drive may be instructed to unload the magnetic recording tape therein, and thereafter load the first magnetic recording tape to perform the requested access, as will be described elsewhere herein, e.g. see operations 1006-1008 of method 1000.

In response to determining that each of the tape drives in which a respective magnetic recording tape is loaded therein have been accessed in less than or equal to the predetermined amount of time (as illustrated by the "No" logical path from sub-decision 1114), the process may continue to sub-decision 1118 for determining whether any of the tape drives, in which a respective magnetic recording tape is loaded therein, are not currently performing a requested access.

At sub-decision 1118, if a single tape drive is not currently performing a requested access, e.g., is idle, it may be selected for operating on the first magnetic recording tape, if such a tape drive is available. However, if multiple tape drives are found that are not currently performing a requested access, the amount of time since performing a requested access may be determined for each of those tape drives that are not currently performing a requested access in sub-operation 1124. In sub-operation 1128, the tape drive with the longest amount of time having been elapsed since performing a requested access is selected. As mentioned elsewhere herein, a tape drive having the longest and/or a relatively longer amount of time since performing a requested access may have a lower likelihood of being accessed prior to one or more other tape drives having more recently accessed magnetic recording tapes. Such a likelihood relies on the assumption that a tape drive that has performed an access more recently has a greater likelihood of performing an access again than a tape drive that performed a last access less recently.

In response to determining that all of the tape drives are currently performing a requested access (as illustrated by the "No" logical path from sub-decision 1118), the amount of time since performing a previous requested access is determined for each of the tape drives in sub-operation 1122. In sub-operation 1126, the tape drive with the longest amount of time having been elapsed since performing the previous requested access is selected.

Once a tape drive is selected, e.g., via sub-operations 1104, 1108, 1112, 1120, 1126 or 1128, the process 1000 of FIG. 10 continues to operation 1006. The selected tape drive may be instructed to unload a magnetic recording tape if one is loaded therein. The selected tape drive may additionally be instructed to unmount the currently loaded magnetic recording tape in the selected tape drive prior to unloading, e.g., so that any updates of the data on the magnetic recording tape are properly indexed.

Referring again to FIG. 10, operation 1006 of method 1000 includes causing the first magnetic recording tape to be loaded into the selected tape drive. Causing the first magnetic recording tape to be loaded into the selected tape drive may include instructing the appropriate components, e.g., accessor, of the storage system to move the first magnetic recording tape to the selected drive. Causing the first magnetic recording tape to be loaded into the selected tape drive may additionally and/or alternatively include instructing the selected tape drive to load the first magnetic recording tape.

According to various embodiments, once loaded, conventional processes may be performed on the first magnetic recording tape, such as mounting.

Operation 1008 of method 1000 includes instructing the selected tape drive to perform an access on the first magnetic recording tape per the request. According to various embodiments, instructing the selected tape drive to perform an access on the first magnetic recording tape per the request may include generating and/or outputting any one or more instructions. According to one approach, instructing the selected tape drive to perform an access on the first magnetic recording tape per the request may include instructing the tape drive to read the index of the first magnetic recording tape. According to another approach, instructing the selected tape drive to perform an access on the first magnetic recording tape per the request may additionally and/or alternatively include instructing the selected tape drive to spool the tape to a location on the first magnetic recording tape, at which the requested access is to be performed. According to yet another approach, instructing the selected tape drive to perform an access on the first magnetic recording tape per the request may additionally and/or alternatively include instructing the selected tape drive to perform an action in accordance with performing the requested access, e.g., reading and/or writing on the first magnetic recording tape.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

A data processing system suitable for storing and/or executing program code may include at least one processor, which may be or be part of a computer, such as a computer in communication with a tape library, a controller, coupled directly or indirectly to memory elements through a system bus, such as processor 400 of FIG. 4. The memory elements can include local memory employed during actual execution of the program code, such as nonvolatile memory 404 of FIG. 4, bulk storage, and cache memories which provide temporary storage of at least some program code in order to reduce the number of times code must be retrieved from bulk storage during execution.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A computer-implemented method, comprising:
receiving, by the computer, a request to access a first magnetic recording tape;
determining, by the computer, whether the first magnetic recording tape is currently loaded in a tape drive;
in response to determining that the first magnetic recording tape is not currently loaded in a tape drive, determining, by the computer, an amount of time to unmount and unload a magnetic recording tape from each of at least two tape drives each having a magnetic recording tape loaded therein;
selecting, by the computer, the tape drive with the shortest amount of time to unmount and unload the magnetic recording tape loaded therein;
instructing, by the computer, the selected tape drive to unload the magnetic recording tape loaded therein; and
causing, by the computer, the first magnetic recording tape to be loaded into the selected tape drive.

2. The method as recited in claim 1, wherein the amount of time to unmount and unload each magnetic recording tape is determined, by the computer, using at least one time variable that corresponds to an operation associated with unmounting and unloading each magnetic recording tape from the associated tape drive, the at least one time variable being selected from the group consisting of: a time to rewind the respective magnetic recording tape, and a time to unload the respective magnetic recording tape from the associated tape drive upon being rewound.

3. The method as recited in claim 1, wherein the determining the amount of time to unmount and unload each respective magnetic recording tape from the at least two tape drives includes determining, by the computer, whether data on the magnetic recording tape has been updated but not yet indexed; and in response to determining that data on the magnetic recording tape has been updated but not yet indexed, estimating, by the computer, each of: a time to move to an end of a data partition of the magnetic recording tape, a time to write an index to the data partition of the magnetic recording tape, a time to move to a position where an index of an index partition is to be written, a time to write the index of the data partition to the index partition of the magnetic recording tape, a time to rewind the magnetic recording tape, and a time to unload the magnetic recording tape; and using the estimated times in the determining.

4. The method as recited in claim 1, wherein the determining the amount of time to unmount and unload each respective magnetic recording tape from the at least two tape drives includes determining, by the computer, whether data on the magnetic recording tape has been updated since mounting and/or since a most recent complete index writing on the magnetic recording tape; and in response to determining that data on the magnetic recording tape has been updated since mounting and an index has been written only to thea data partition of the magnetic recording tape after the updating, estimating, by the computer, each of: a time to move to a position where an index of an index partition is to be written, a time to write the index of the data partition to the index partition of the magnetic recording tape, a time to rewind the magnetic recording tape, and a time to unload the magnetic recording tape; and using the estimated times in the determining.

5. The method as recited in claim 1, wherein the determining the amount of time to unmount and unload each respective magnetic recording tape from the at least two tape drives includes determining, by the computer, whether data on the magnetic recording tape has been updated since mounting and/or since a most recent complete index writing on the magnetic recording tape, and in response to determining that data on the magnetic recording tape has not been updated, estimating, by the computer, each of: a time to rewind the magnetic recording tape, and a time to unload the magnetic recording tape; and using, by the computer, the estimated times in the determining.

6. The method as recited in claim 1, comprising selecting, by the computer, the at least two tape drives for the determination of the amount of time to unmount and unload the respective magnetic recording tape therefrom based on the least two tape drives not having been accessed for more than a predetermined amount of time.

7. The method as recited in claim 6, comprising, in response to determining that no tape drives have not been accessed for more than the predetermined amount of time, selecting, by the computer, a tape drive not currently performing a requested access.

8. A computer program product, the computer program product comprising a computer readable storage medium having program instructions embodied therewith, wherein the computer readable storage medium is not a transitory signal per se, the program instructions readable and/or executable by a computer, to cause the computer to perform a method comprising:
receive, by the computer, a request to access a first magnetic recording tape;
determine, by the computer, whether the first magnetic recording tape is currently loaded in a tape drive;
in response to determining that the first magnetic recording tape is not currently loaded in a tape drive, determine, by the computer, an amount of time to unmount and unload a magnetic recording tape from each of at least two tape drives each having a magnetic recording tape loaded therein;
select, by the computer, the tape drive with the shortest amount of time to unmount and unload the magnetic recording tape loaded therein;
instruct, by the computer, the selected tape drive to unload the magnetic recording tape loaded therein; and
cause, by the computer, the first magnetic recording tape to be loaded into the selected tape drive.

9. The computer program product as recited in claim 8, wherein the amount of time to unmount and unload each magnetic recording tape is determined, by the computer, using at least one time variable that corresponds to an operation associated with unmounting and unloading each magnetic recording tape from the associated tape drive, the at least one time variable being selected from the group consisting of: a time to rewind the respective magnetic recording tape, and a time to unload the respective magnetic recording tape from the associated tape drive upon being rewound.

10. The computer program product as recited in claim 8, wherein the determining the amount of time to unmount and unload each respective magnetic recording tape from the at least two tape drives includes determining, by the computer, whether data on the magnetic recording tape has been updated but not yet indexed; and in response to determining that data on the magnetic recording tape has been updated but not yet indexed, estimating, by the computer, each of: a time to move to an end of a data partition of the magnetic recording tape, a time to write an index to the data partition of the magnetic recording tape, a time to move to a position where an index of an index partition is to be written, a time to write the index of the data partition to the index partition of the magnetic recording tape, a time to rewind the magnetic recording tape, and a time to unload the magnetic recording tape; and using the estimated times in the determining.

11. The computer program product as recited in claim 8, wherein the determining the amount of time to unmount and unload each respective magnetic recording tape from the at least two tape drives includes determining, by the computer, whether data on the magnetic recording tape has been updated since mounting and/or since a most recent complete index writing on the magnetic recording tape; and in response to determining that data on the magnetic recording tape has been updated since mounting and an index has been written only to a data partition of the magnetic recording tape after the updating, estimating, by the computer, each of: a time to move to a position where an index of an index partition is to be written, a time to write the index of the data partition to the index partition of the magnetic recording tape, a time to rewind the magnetic recording tape, and a time to unload the magnetic recording tape; and using the estimated times in the determining.

12. The computer program product as recited in claim 8, wherein the determining the amount of time to unmount and unload each respective magnetic recording tape from the at least two tape drives includes determining, by the computer, whether data on the magnetic recording tape has been updated but not yet indexed, and in response to determining that data on the magnetic recording tape has not been updated, estimating, by the computer, each of: a time to rewind the magnetic recording tape, and a time to unload the magnetic recording tape; and using, by the computer, the estimated times in the determining.

13. The computer program product as recited in claim 8, comprising selecting, by the computer, the at least two tape drives for the determination of the amount of time to unmount and unload the respective magnetic recording tape therefrom based on the least two tape drives not having been accessed for more than a predetermined amount of time.

14. The computer program product as recited in claim 13, comprising, in response to determining that no tape drives have not been accessed for more than the predetermined amount of time, selecting, by the computer, a tape drive not currently performing a requested access.

15. A computer-implemented method, comprising:
receiving, by the computer, a request to access a first magnetic recording tape;
determining, by the computer, whether the first magnetic recording tape is currently loaded in a tape drive;
in response to determining that the first magnetic recording tape is not currently loaded in a tape drive, determining, by the computer, whether one or more tape drives do not have a respective magnetic recording tape loaded therein;
in response to determining that each of the one or more tape drives have a respective magnetic recording tape loaded therein, determining, by the computer, whether any of the tape drives in which a respective magnetic recording tape is loaded therein have not mounted the respective magnetic recording tape loaded therein;
in response to determining that each of the one or more tape drives having a respective magnetic recording tape loaded therein have mounted the respective magnetic recording tapes loaded therein, determining, by the computer, whether any of the one or more tape drives have not been accessed for more than a predetermined amount of time;
in response to determining that at least two of the tape drives have not been accessed for more than a predetermined amount of time, determining, by the computer, an amount of time to unmount and unload a magnetic recording tape from each of the at least two tape drives that have not been accessed for more than a predetermined amount of time;
selecting, by the computer, the tape drive with the shortest amount of time to unmount and unload the magnetic recording tape loaded therein;
instructing, by the computer, the selected tape drive to unload the magnetic recording tape loaded therein; and
causing, by the computer, the first magnetic recording tape to be loaded into the selected tape drive;
in response to determining that each of the tape drives in which a respective magnetic recording tape is loaded therein have been accessed in less than or equal to the predetermined amount of time, determining, by the computer, whether any of the tape drives, in which a respective magnetic recording tape is loaded therein, are not currently performing a requested access;
in response to determining that one or more of the tape drives in which a respective magnetic recording tape is loaded therein are not currently performing a requested access, determining, by the computer, the amount of time since performing a requested access, for each of the one or more tape drives that are not currently performing a requested access;
selecting, by the computer, the tape drive with the longest amount of time having been elapsed since performing a requested access;
instructing, by the computer, the selected tape drive to unload the magnetic recording tape loaded therein; and
causing, by the computer, the first magnetic recording tape to be loaded into the selected tape drive.

16. The method as recited in claim 15, comprising: in response to determining that the first magnetic recording tape is loaded in a tape drive, selecting, by the computer, the tape drive in which the first magnetic recording tape is loaded.

17. The method as recited in claim 15, wherein the amount of time to unmount and unload each magnetic recording tape is determined, by the computer, using at least one time variable that corresponds to an operation associated with unmounting and unloading each magnetic recording tape from the associated tape drive, the at least one time variable being selected from the group consisting of: a time to rewind the respective magnetic recording tape, and a time to unload the respective magnetic recording tape from the associated tape drive upon being rewound.

18. The method as recited in claim 15, wherein the determining the amount of time to unmount and unload each respective magnetic recording tape from the at least two tape drives includes determining, by the computer, whether data on the magnetic recording tape has been updated but not yet indexed; and in response to determining that data on the magnetic recording tape has been updated but not yet indexed, estimating, by the computer, each of: a time to move to an end of a data partition of the magnetic recording tape, a time to write an index to the data partition of the magnetic recording tape, a time to move to a position where an index of an index partition is to be written, a time to write the index of the data partition to the index partition of the magnetic recording tape, a time to rewind the magnetic recording tape, and a time to unload the magnetic recording tape; and using the estimated times in the determining.

19. The method as recited in claim 15, wherein the determining the amount of time to unmount and unload each respective magnetic recording tape from the at least two tape drives includes determining, by the computer, whether data on the magnetic recording tape has been updated but not yet indexed, and in response to determining that data on the magnetic recording tape has not been updated, estimating, by the computer, each of: a time to rewind the magnetic recording tape, and a time to unload the magnetic recording tape; and using, by the computer, the estimated times in the determining.

20. The method as recited in claim 15, wherein the determining the amount of time to unmount and unload each respective magnetic recording tape from the at least two tape drives includes determining, by the computer, whether data on the magnetic recording tape has been updated since mounting and/or since a most recent complete index writing on the magnetic recording tape; and in response to determining that data on the magnetic recording tape has been updated since mounting and an index has been written only to thea data partition of the magnetic recording tape after the updating, estimating, by the computer, each of: a time to move to a position where an index of an index partition is to be written, a time to write the index of the data partition to the index partition of the magnetic recording tape, a time to rewind the magnetic recording tape, and a time to unload the magnetic recording tape; and using the estimated times in the determining.

\* \* \* \* \*